(12) United States Patent
Ventura et al.

(10) Patent No.: US 11,109,105 B2
(45) Date of Patent: Aug. 31, 2021

(54) GRAPHICAL USER INTERFACE FOR INSIGHTS ON VIEWING OF MEDIA CONTENT

(71) Applicant: SHARP NEC DISPLAY SOLUTIONS, LTD., Tokyo (JP)

(72) Inventors: Richard Ventura, La Grange Park, IL (US); Hiroyuki Kasuga, Lombard, IL (US); Steven Keith Platt, Chicago, IL (US)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/708,043

(22) Filed: Dec. 9, 2019

(65) Prior Publication Data

US 2020/0225815 A1    Jul. 16, 2020

Related U.S. Application Data

(60) Provisional application No. 62/791,089, filed on Jan. 11, 2019, provisional application No. 62/823,329, filed on Mar. 25, 2019.

(51) Int. Cl.
*G06F 3/0482* (2013.01)
*H04N 21/47* (2011.01)
(Continued)

(52) U.S. Cl.
CPC ........... *H04N 21/47* (2013.01); *G06F 3/0482* (2013.01); *G06N 20/00* (2019.01);
(Continued)

(58) Field of Classification Search
None
See application file for complete search history.

(56) References Cited

U.S. PATENT DOCUMENTS 7,921,036 B1   4/2011  Sharma et al.
7,965,866 B2   6/2011  Wang et al.
(Continued)

FOREIGN PATENT DOCUMENTS

JP    2001-229084 A    8/2001
JP    2010-160780 A    7/2010
(Continued)

OTHER PUBLICATIONS

International Search Report in International Application No. PCT/JP2020/001625, dated Apr. 21, 2020.
(Continued)

*Primary Examiner* — Ryan F Pitaro
(74) *Attorney, Agent, or Firm* — Sughrue Mion, PLLC

(57) ABSTRACT

Systems and methods relate to display of insights, including a system including a remote computing system configured to cause a user display to display a graphical user interface (GUI), wherein the GUI enables a user to select a time range and a locale, the GUI displays a list of a plurality of media content that have been displayed on one or more digital displays associated with the locale, each of the plurality of media content being listed according to impression counts of each of the plurality of media content for the locale selected and the time range selected, and each of the impression counts is a count of views by people of a respective media content of the plurality media content on the one or more digital displays of the locale.

20 Claims, 20 Drawing Sheets

(51) Int. Cl.
   *H04N 21/45*       (2011.01)
   *G06N 20/00*       (2019.01)
   *H04N 21/462*      (2011.01)
   *H04N 7/173*       (2011.01)
   *G06Q 30/02*       (2012.01)

(52) U.S. Cl.
   CPC ..... *G06Q 30/0201* (2013.01); *H04N 7/17318* (2013.01); *H04N 21/4532* (2013.01); *H04N 21/4622* (2013.01)

(56) References Cited

U.S. PATENT DOCUMENTS

| | | | |
|---|---|---|---|
| 7,987,105 B2 | 6/2011 | McNeill et al. | |
| 8,238,607 B2 | 8/2012 | Wang et al. | |
| 8,472,672 B2 | 6/2013 | Wang et al. | |
| 9,177,195 B2 | 11/2015 | Marcheselli et al. | |
| 9,305,363 B2 | 4/2016 | Marcheselli et al. | |
| 9,384,407 B2 | 7/2016 | Wang et al. | |
| 9,569,786 B2 | 2/2017 | Shaw et al. | |
| 9,734,388 B2 | 8/2017 | Marcheselli et al. | |
| 9,852,375 B2 | 12/2017 | Sanjay et al. | |
| 9,882,955 B2 | 1/2018 | Jamtgaard et al. | |
| 10,015,543 B1* | 7/2018 | Peterkofsky | H04N 21/44218 |
| 10,091,549 B1* | 10/2018 | Dalbec | H04N 21/4524 |
| 10,134,146 B2 | 11/2018 | Saleemi et al. | |
| 10,296,936 B1 | 5/2019 | Saurabh et al. | |
| 2002/0111892 A1 | 8/2002 | Sharp et al. | |
| 2006/0282328 A1 | 12/2006 | Gerace et al. | |
| 2007/0214097 A1* | 9/2007 | Parsons | G06Q 30/0264 706/12 |
| 2009/0030780 A1 | 1/2009 | York et al. | |
| 2010/0313214 A1 | 12/2010 | Moriya et al. | |
| 2011/0040760 A1* | 2/2011 | Fleischman | H04N 21/812 707/737 |
| 2012/0084340 A1* | 4/2012 | McCormack | G06Q 30/01 709/203 |
| 2012/0140069 A1* | 6/2012 | Ding | H04N 21/44213 348/143 |
| 2013/0111512 A1* | 5/2013 | Scellato | H04N 21/6582 725/14 |
| 2013/0236058 A1 | 9/2013 | Wang et al. | |
| 2013/0339156 A1 | 12/2013 | Sanjay et al. | |
| 2013/0342689 A1 | 12/2013 | Sanjay et al. | |
| 2014/0040371 A1* | 2/2014 | Gurevich | G06F 16/9537 709/204 |
| 2014/0079282 A1 | 3/2014 | Marcheselli et al. | |
| 2014/0095306 A1 | 4/2014 | Avalos et al. | |
| 2014/0172504 A1* | 6/2014 | Duva | G06Q 30/0242 705/7.31 |
| 2015/0199729 A1 | 7/2015 | Saccoman | |
| 2015/0310447 A1 | 10/2015 | Shaw | |
| 2016/0034945 A1* | 2/2016 | Lewis | G06Q 30/0242 705/14.41 |
| 2016/0103592 A1* | 4/2016 | Prophete | G06F 3/04845 715/771 |
| 2016/0117718 A1* | 4/2016 | Hood | H04N 21/2668 725/14 |
| 2016/0119689 A1* | 4/2016 | Hood | H04N 21/44204 725/14 |
| 2016/0171547 A1 | 6/2016 | Sjölund et al. | |
| 2016/0189038 A1 | 6/2016 | Sanjay et al. | |
| 2016/0189181 A1* | 6/2016 | McClave | G06Q 30/0204 705/7.33 |
| 2016/0239874 A1 | 8/2016 | Avalos et al. | |
| 2016/0259539 A1 | 9/2016 | Lee et al. | |
| 2016/0267532 A1 | 9/2016 | Saccoman | |
| 2016/0379251 A1 | 12/2016 | Sanjay et al. | |
| 2016/0379261 A1 | 12/2016 | Avalos et al. | |
| 2017/0061469 A1* | 3/2017 | Garrity | G06Q 50/01 |
| 2017/0169464 A1* | 6/2017 | Miller | G06Q 30/0261 |
| 2017/0373950 A1 | 12/2017 | Szilagyi et al. | |
| 2018/0068344 A1* | 3/2018 | Sultzaberger | G06F 16/7867 |
| 2018/0184252 A1 | 6/2018 | Chew et al. | |
| 2018/0198543 A1* | 7/2018 | Perrin | H04H 60/22 |
| 2018/0285469 A1* | 10/2018 | Hahn | H04L 67/2804 |
| 2018/0293249 A1* | 10/2018 | Tabares | H04W 4/023 |
| 2018/0293617 A1 | 10/2018 | Pittman | |
| 2018/0300761 A1 | 10/2018 | Pittman | |
| 2018/0365734 A1 | 12/2018 | Silva et al. | |
| 2019/0035007 A1* | 1/2019 | Yepez | G06Q 50/01 |
| 2019/0044989 A1* | 2/2019 | Veeramani | H04N 21/4667 |
| 2019/0141399 A1* | 5/2019 | Auxer | H04N 21/4753 |
| 2019/0188733 A1* | 6/2019 | Rao | G06N 20/00 |

FOREIGN PATENT DOCUMENTS

| | | |
|---|---|---|
| JP | 2011-8571 A | 1/2011 |
| JP | 2011-233120 A | 11/2011 |
| JP | 2015-55924 A | 3/2015 |
| JP | 2016-71501 A | 5/2016 |
| JP | 2016-177410 A | 10/2016 |
| JP | 2018-97465 A | 6/2018 |

OTHER PUBLICATIONS

International Search Report in International Application No. PCT/JP2020/001624, dated Apr. 21, 2020.

\* cited by examiner

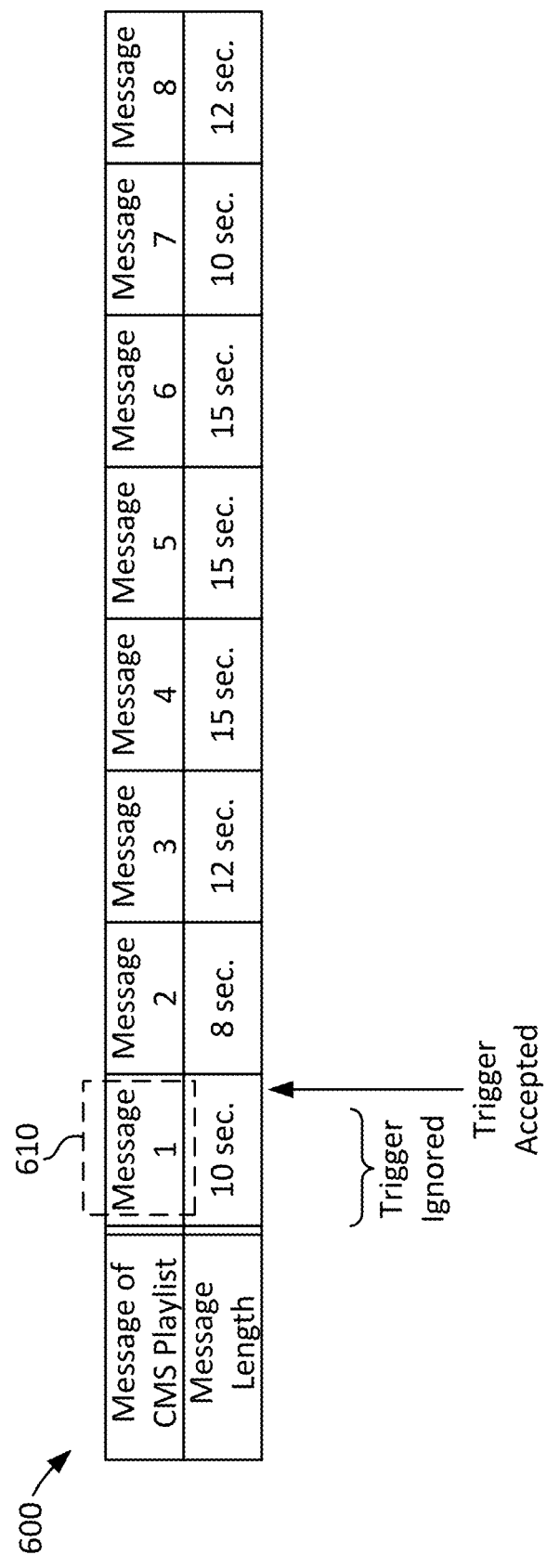
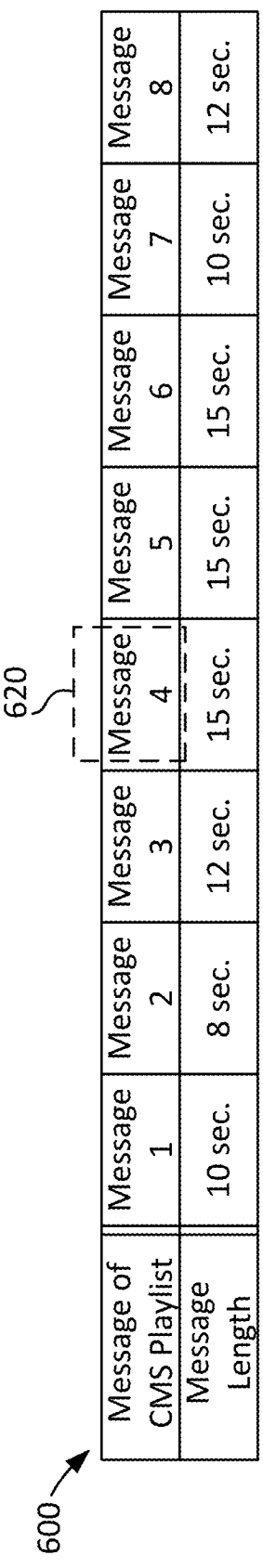
FIG. 10A
FIG. 10B

FIG. 10C
600 ⬈

| Message of CMS Playlist | Message 1 | Message 2 | Message 3 | Message 4 | Message 5 | Message 6 | Message 7 | Message 8 |
|---|---|---|---|---|---|---|---|---|
| Message Length | 10 sec. | 8 sec. | 12 sec. | 15 sec. | 15 sec. | 15 sec. | 10 sec. | 12 sec. |

630 indicates Message 2 / 8 sec.

FIG. 10D
600 ⬈

| Message of CMS Playlist | Message 1 | Message 2 | Message 3 | Message 4 | Message 5 | Message 6 | Message 7 | Message 8 |
|---|---|---|---|---|---|---|---|---|
| Message Length | 10 sec. | 8 sec. | 12 sec. | 15 sec. | 15 sec. | 15 sec. | 10 sec. | 12 sec. |

640 indicates Message 3 / 12 sec.

Triggers Ignored ← Trigger Accepted

FIG. 10E

| Message of CMS Playlist | Message 1 | Message 2 | Message 3 | Message 4 | Message 5 | Message 6 | Message 7 | Message 8 |
|---|---|---|---|---|---|---|---|---|
| Message Length | 10 sec. | 8 sec. | 12 sec. | 15 sec. | 15 sec. | 15 sec. | 10 sec. | 12 sec. |

FIG. 16
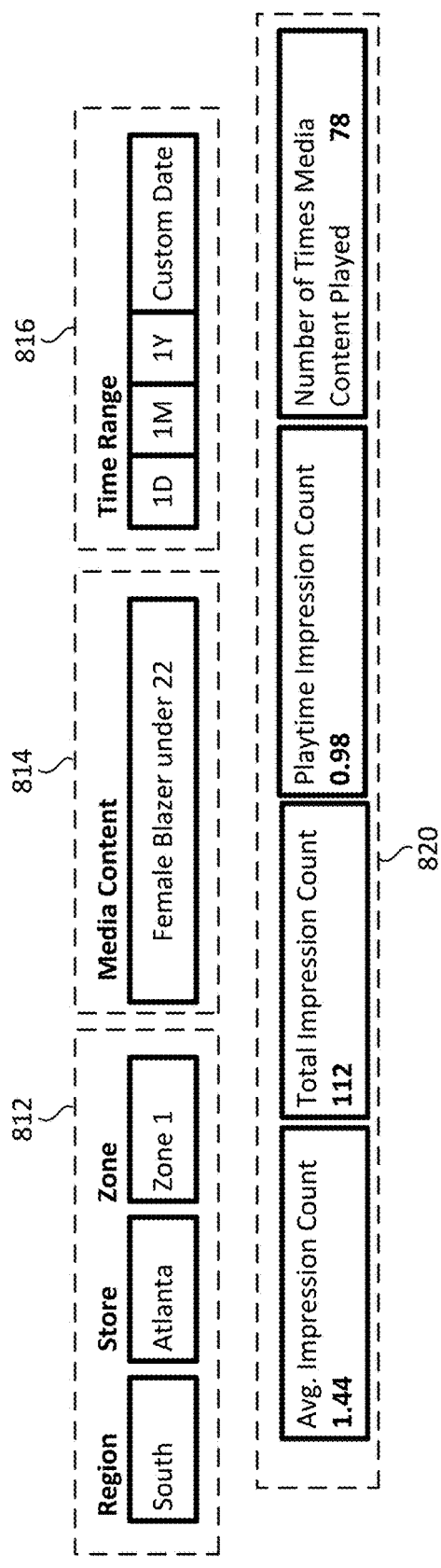
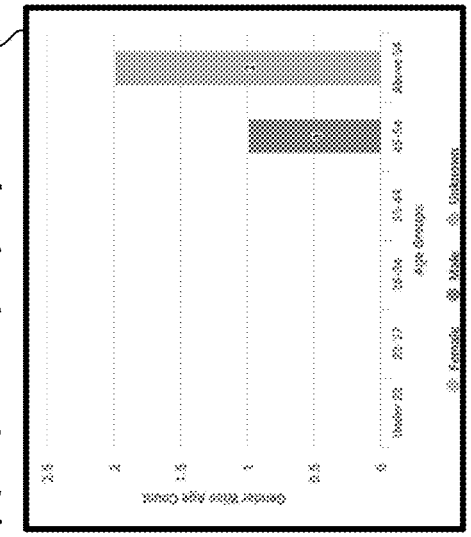
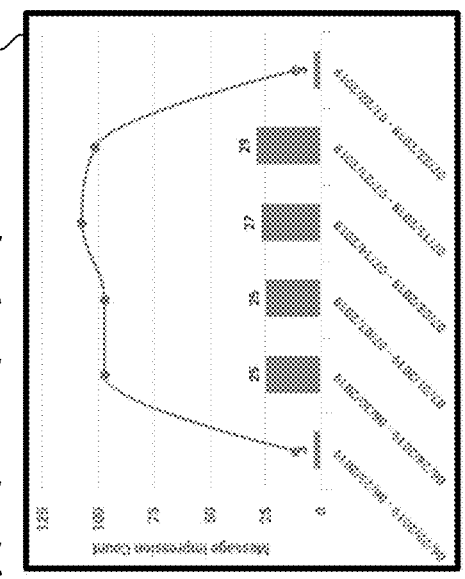

FIG. 17
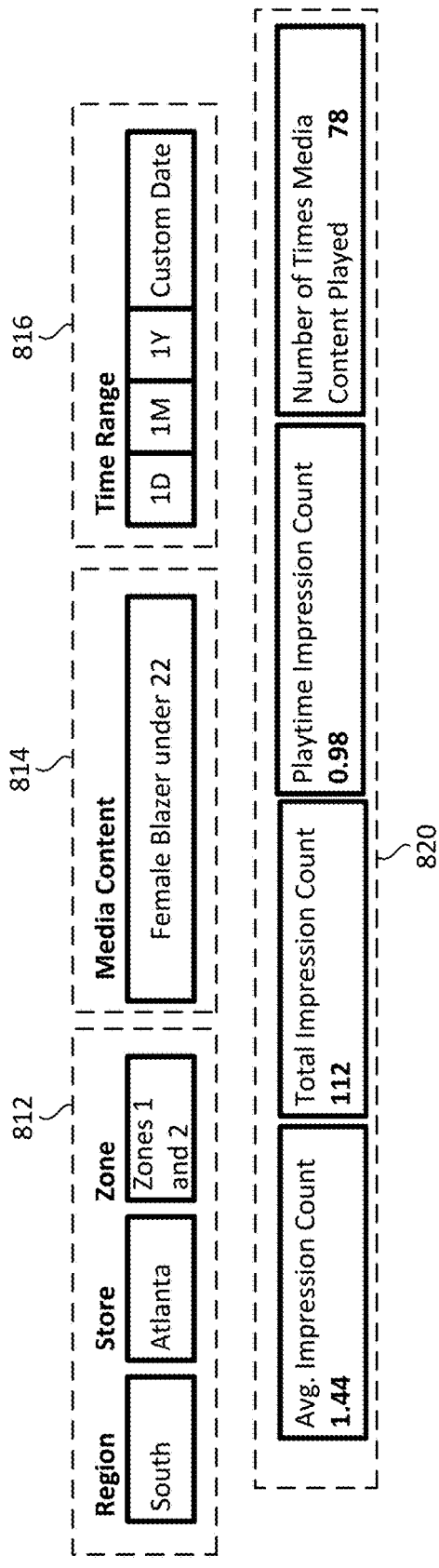
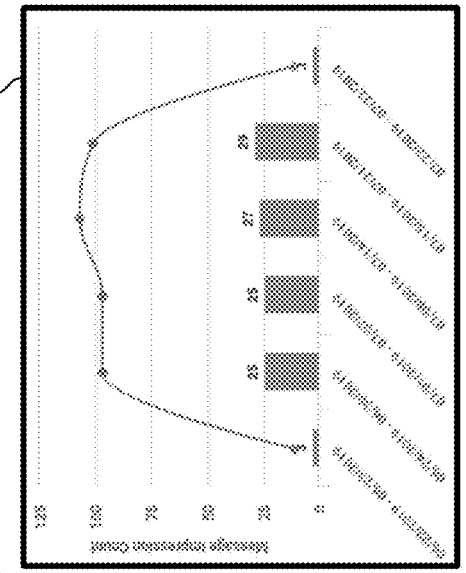
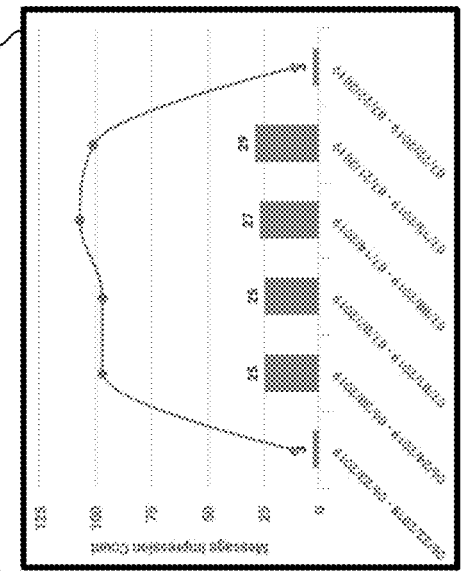

FIG. 18  850
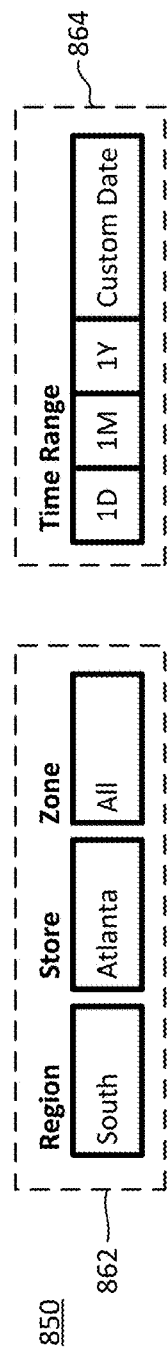
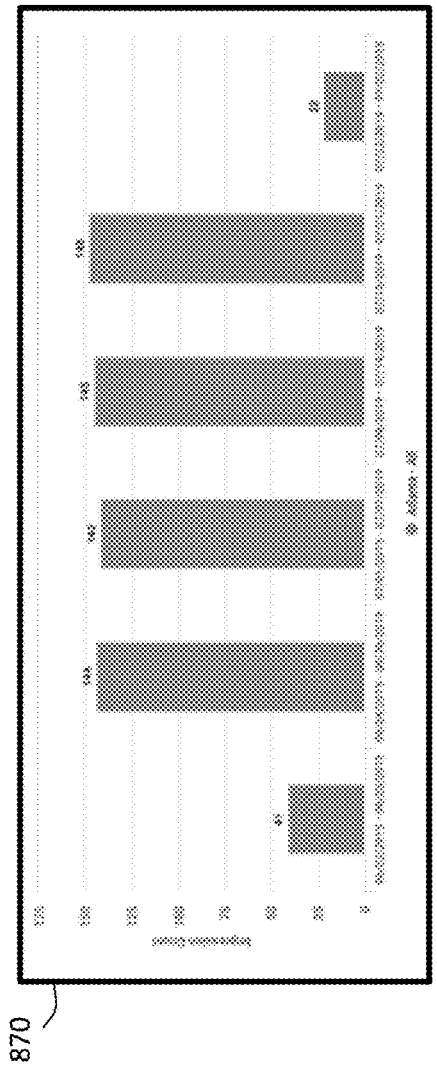
Total Message Impression
Count for All Zones
(6/22/19 – 7/22/19)
Age and Gender
Distribution for All Zones
(6/22/19 – 7/22/19)

GRAPHICAL USER INTERFACE FOR INSIGHTS ON VIEWING OF MEDIA CONTENT

CROSS-REFERENCE TO RELATED APPLICATIONS

This application claims priority from U.S. Provisional Application No. 62/791,089, filed on Jan. 11, 2019, and U.S. Provisional Application No. 62/823,329, filed on Mar. 25, 2019, the disclosures of which are incorporated herein by reference in their entirety.

FIELD

This disclosure is related to the display of media content, and more particularly the display of analytics for the targeted display of media content.

BACKGROUND

Some prior systems attempt to provide targeted media content to viewers. However, there is complexity associated with the delivery of highly relevant, targeted media content. For example, there is a problem in managing and understanding the data that is required to determine which media content should be delivered to which individuals at what time and place. Moreover, there is a need to better understand the performance and productivity of entities that are displaying targeted media content, how various factors affect the performance and productivity, how the performance and productivity can be enhanced, and how individuals that view targeted and non-targeted media content provided on displays behave.

SUMMARY

Some embodiments of the present disclosure solve the previously mentioned problems and other problems of background art.

Some embodiments of the present disclosure enable the targeted display of media content and the creation of new media content for targeted display. Some embodiments of the present disclosure enable the upload of data to be used in analysis to perform targeted display and media content creation, to be used to update rules or an AI model that is downloadable and used to perform targeted display of media content, and to be used in be analysis, visualization, and reporting.

In some embodiments, a system is provided. The system comprises a remote computing system configured to cause a user display to display a graphical user interface (GUI), wherein the GUI enables a user to select a time range and a locale, the GUI displays a list of a plurality of media content that have been displayed on one or more digital displays associated with the locale, each of the plurality of media content being listed according to impression counts of each of the plurality of media content for the locale selected and the time range selected, and each of the impression counts is a count of views by people of a respective media content of the plurality media content on the one or more digital displays of the locale.

In an embodiment, in response to the user selecting media content of the list of the plurality of media content displayed on the GUI, the GUI displays age and gender distributions of the impression count of the media content selected for the locale selected and the time range selected.

In an embodiment, in response to the user selecting media content of the list of the plurality of media content displayed on the GUI, the GUI displays age and gender distributions of an opportunity to see (OTS) count of the media content selected for the locale selected and the time range selected, the OTS count being a count of people who were determined to have had an opportunity to see the media content on the one or more digital displays of the locale.

In an embodiment, the GUI enables the user to select one or both of triggered media content and non-triggered media content of the plurality of media content that have been displayed, and the GUI displays the list of the plurality of media content based on selection of one or both of the triggered media content and the non-triggered media content, the triggered media content being media content selectively displayed on at least one of the one or more digital displays based on information about at least one person while the at least one person is at the locale, and the non-triggered media content being media content that is displayed on at least one of the one or more digital displays according to a playlist of the media content scheduled in advance.

In an embodiment, the remote computing system is further configured to receive, via a wide area network, customer demographics data from a local computing system that obtains the customer demographics data by processing camera data received from at least one camera, the local computing system is configured to select media content from the plurality of media content based on applying the customer demographics data to the rule set or AI model, and cause at least one of the one or more digital displays to play the media content based on selecting the media content. In an embodiment, the remote computing system is further configured to receive, from the local computing system via the wide area network, analytics data comprising dates and times of displaying of the media content on the at least one of the one or more digital displays, a customer identification (ID) of at least one person of the people, orientation information of a face of the at least one person, and the customer demographics information, and the remote computing system obtains the impression counts of the plurality of media content based on the analytics data. In an embodiment, the remote computing system is further configured to receive proof of play data that comprises the dates and the times of displaying of the plurality of media content on the at least one of the one or more digital displays, and IDs of the plurality of media content displayed on the at least one of the one or more digital displays, and the remote computing system obtains the impression counts of the plurality of media content based on the analytics data and the proof of play data.

In an embodiment, the remote computing system is further configured to receive analytics data comprising dates and times of displaying of the plurality of media content on at least one of the one or more digital displays, a customer identification (ID) of at least one person of the people, orientation information of a face of the at least one person, and customer demographics information, and the remote computing system obtains the impression counts of the plurality of media content based on the analytics data. In an embodiment, the remote computing system is further configured to receive proof of play data that comprises the dates and times of displaying of the media content on the at least one of the one or more digital displays, and IDs of the plurality of media content displayed on the at least one of the one or more digital displays, and the remote computing system obtains the impression counts of the plurality of media content based on the analytics data and the proof of play data. In an embodiment, the remote computing system obtains opportunity to see (OTS) counts of the plurality of media content based on the analytics data and the proof of play data, each of the OTS counts being a count of people who were determined to have had an opportunity to see a respective media content displayed on at least one of the one or more digital displays.

In an embodiment, the locale selectable is at least one from among a location including the one or more digital displays, a zone within the location in which the one or more digital displays is viewable, or the one or more digital displays. In an embodiment, the location is a store.

In some embodiments, a method is provided that is performed by a remote computing system. The method comprises causing a user display to display a graphical user interface (GUI) that enables a user to select a time range and a locale; and causing the user display to display, on the GUI, a list of a plurality of media content that have been displayed on one or more digital displays associated with the locale, each of the plurality of media content being listed according to impression counts of each of the plurality of media content for the locale selected and the time range selected, wherein each of the impression counts is a count of views by people of a respective media content of the plurality media content on the one or more digital displays of the locale.

In an embodiment, the method further comprises causing, in response to the user selecting media content of the list of the plurality of media content displayed on the GUI, the user display to display, on the GUI, age and gender distributions of the impression count of the media content selected for the locale selected and the time range selected.

In an embodiment, the method further comprises causing, in response to the user selecting media content of the list of the plurality of media content displayed on the GUI, the user display to display, on the GUI, age and gender distributions of an opportunity to see (OTS) count of the media content selected for the locale selected and the time range selected, wherein the OTS count is a count of people who were determined to have had an opportunity to see the media content on the one or more digital displays of the locale.

In an embodiment, the GUI displayed enables the user to select one or both of triggered media content and non-triggered media content of the plurality of media content that have been displayed on the one or more digital displays, and the GUI displays the list of the plurality of media content based on selection of one or both of the triggered media content and the non-triggered media content, the triggered media content being media content selectively displayed on at least one of the one or more digital displays based on information about at least one person while the at least one person is at the locale, and the non-triggered media content being media content that is displayed on at least one of the one or more digital displays according to a playlist of the media content scheduled in advance.

In an embodiment, the method further comprises receiving, via a wide area network, customer demographics data from a local computing system that obtains the customer demographics data by processing camera data received from at least one camera, wherein the local computing system is configured to select media content from the plurality of media content based on applying the customer demographics data to the rule set or AI model, and cause at least one of the one or more digital displays to play the media content based on selecting the media content. In an embodiment, the method further comprises receiving, from the local computing system via the wide area network, analytics data comprising dates and times of displaying of the plurality of media content on the at least one of the one or more digital displays, a customer identification (ID) of at least one person of the people, orientation information of a face of the at least one person, and the customer demographics information; and obtaining the impression counts of the plurality of media content based on the analytics data. In an embodiment, the method further comprises receiving proof of play data that comprises the dates and the times of displaying of the plurality of media content on the at least one of the one or more digital displays, and IDs of the plurality of media content displayed on the at least one of the one or more digital displays; and obtaining the impression counts of the plurality of media content based on the analytics data and the proof of play data.

In an embodiment, the method further comprises receiving analytics data comprising dates and times of displaying of the plurality of media content on at least one of the one or more digital displays, a customer identification (ID) of at least one person of the people, orientation information of a face of the at least one person, and customer demographics information, and obtaining the impression counts of the plurality of media content based on the analytics data.

In some embodiments, a system is provided. The system comprises a remote computing system configured to cause a user display to display a graphical user interface (GUI), wherein the GUI enables a user to select a time range, a locale, and media content from a list of a plurality of media content, the GUI displays viewing analytics information of the media content selected for the time range selected and the locale selected, and the viewing analytics information includes an impression count that is a count of views by people of the media content selected on one or more digital displays associated with the locale selected, or an opportunity to see (OTS) count that is a count of people who were determined to have had an opportunity to see the media content displayed on the one or more digital displays of the locale.

In an embodiment, the GUI enables the user to select a second locale, and the GUI displays viewing analytics information of the media content selected for the time range selected and the second locale selected, at a same time in which the GUI displays the viewing analytics information of the media content selected for the time range selected and the locale selected.

BRIEF DESCRIPTION OF THE DRAWINGS

Further features, the nature, and various advantages of the disclosed subject matter will be more apparent from the following detailed description and the accompanying drawings in which:

FIG. 10A is a diagram demonstrating a first part of an example sequence of interactions between an ALP system and a CMS of an embodiment.

FIG. 10B is a diagram demonstrating a second part of the example sequence of interactions between the ALP system and the CMS of the embodiment.

FIG. 10C is a diagram demonstrating a third part of the example sequence of interactions between the ALP system and the CMS of the embodiment.

FIG. 10D is a diagram demonstrating a fourth part of the example sequence of interactions between the ALP system and the CMS of the embodiment.

FIG. 10E is a diagram demonstrating a fifth part of the example sequence of interactions between the ALP system and the CMS of the embodiment.

FIG. 16 illustrates a GUI of an embodiment.

FIG. 17 illustrates a GUI of an embodiment.

FIG. 18 illustrates a GUI of an embodiment.

DETAILED DESCRIPTION

Figure 1:
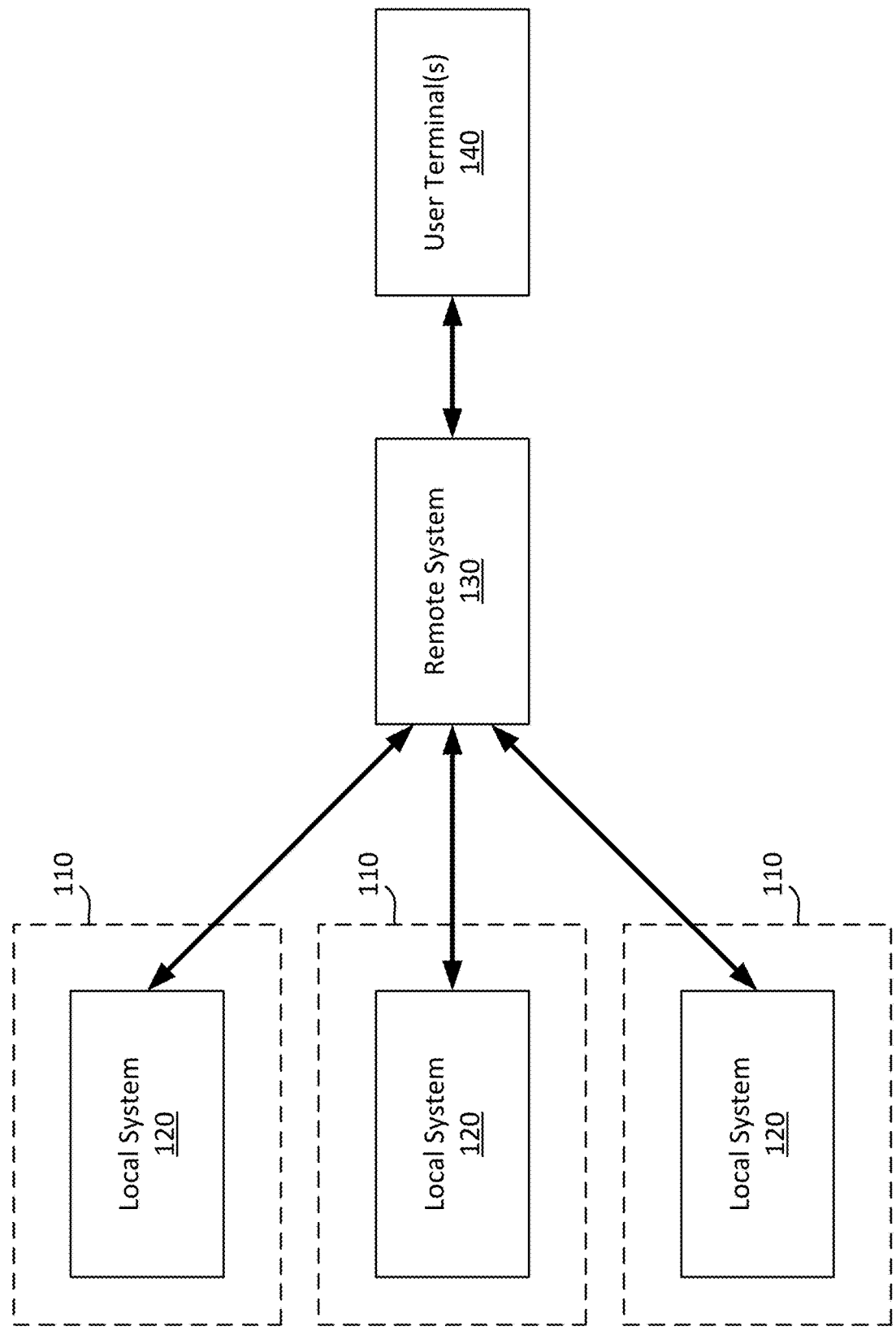
FIG. 1 illustrates an overview of a system of an embodiment.
Figure 2:
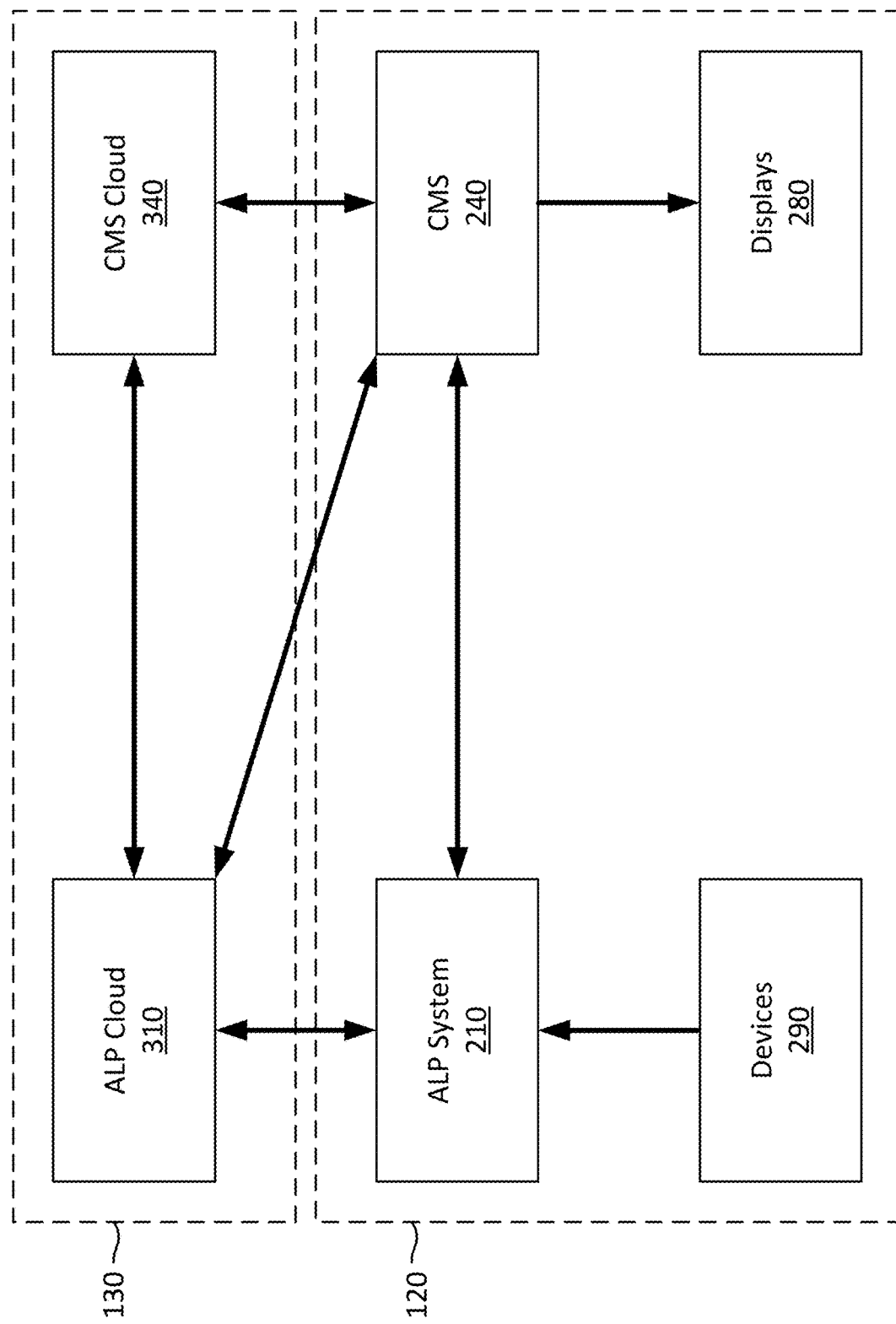
FIG. 2 illustrates a remote system and a local system of an embodiment.

FIG. 1 illustrates a system of an embodiment of the present disclosure. As illustrated in FIG. 1, the system comprises one or more local systems 120, a remote system 130, and one or more user terminals 140 that may be, for example, computing devices with displays. In an embodiment, each of the local systems 120 may be located in a respective location 110 (e.g. a store). In an embodiment, as illustrated in FIG. 2, each local system 120 may comprise an analytics learning platform (ALP) system 210, a content management system (CMS) 240, devices 290, and displays 280 that are digital displays. The remote system 130 may include, for example, an ALP cloud 310 and a CMS cloud 340.

The local system 120 and the remote system 130 may be in remote communication with the each other. For example, with reference to FIG. 2, the ALP cloud 310 of the remote system 130 may be in remote communication with the ALP system 210 and the CMS 240 of the local system 120, and the CMS cloud 340 of the remote system 130 may be in remote communication with the CMS 240 of the local system 120. The ALP system 210, CMS 240, devices 290, and displays 280 of the local system 120 may be in local communication with each other. For example, with reference to FIG. 2, the devices 290 may locally communicate with the ALP system 210, the ALP system 210 and the CMS 240 may locally communicate with each other, and the CMS 240 may further locally communicate with the displays 280. With reference to FIG. 2, the ALP cloud 310 and the CMS cloud 340 of the remote system 130 may be in remote communication with each other. Remote communication refers to, for example, any wide area network (e.g. the internet). Local communication refers to communication using local area network technologies without using remote communication. For example, local communication includes local area wired connections (e.g. coaxial, twisted pair, fiber optic, etc.) and local area wireless communication methods (e.g. Bluetooth, Wi-FI, Zigbee, etc.)

In embodiments, the ALP cloud 310 and the CMS cloud 340 may each be a respective cloud computing system implemented as a cloud server. In embodiments, the ALP cloud 310 and the CMS cloud 340 may be integrated together as a single cloud of the remote system 130, or have their functions divided between any number of separate cloud computing systems that may be included in the remote system 130. In embodiments, the ALP cloud 310 and the CMS cloud may alternatively be implemented outside a cloud computing system by, for example, a dedicated server(s).

With reference to FIG. 2, components of the remote system 130 (e.g. the ALP cloud 310 and/or the CMS cloud 340) may be configured to perform any number of the following example functions in embodiments: (1) receive data from external sources concerning weather and events; (2) receive data from the ALP system 210 concerning store count, crowd count, and demographics data; (3) receive data from retail sources or the ALP system 210 concerning point of sales (POS) and customer relationship management (CRM), inventory, and product catalog; (4) receive data from the ALP system 210 or the CMS 240, concerning proof that media content is played by at least one of the displays 280; (5) receive data concerning proof that media content has been sent to the CMS 240 from the remote system 130; (6) create and update a rule set or artificial intelligence (AI) model based on the data received from the external sources, the ALP system 210, and the retail sources, or based on an input from a user terminal(s) 140; (7) send the rule set or the AI model to the ALP system 210; (8) create new media content automatically by applying the data received from the ALP system 210, the external sources, and the retail sources to a same or different rule set or AI model stored in the ALP cloud 310, or create the new media content manually via an input on a user terminal(s) 140, the new media content including images, video, and/or text that is stored in memory of the remote system 130; (9) update the images, video, and/or text available in the memory of the remote system 130, based on an input on the user terminal(s) 140; (10) send the new media content to the CMS 240; (11) cause the CMS device to play the new media content: (12) send CMS playlist data to the local system 120. (13) send the plurality of media content, including the new media content, to the ALP system 210 or the CMS 240; (14) prepare and output a report to a user terminal(s) 140, based on the data received from the CMS 240, the ALP system 210, and the external sources, to the user terminal(s) 140; (15) report, on the user terminal(s) 140, the demographics information of the people who have watched the triggered media content for at least a specified time period on at least one of the displays 280; (16) report, on the user terminal(s) 140, the time people spent watching the triggered media content on at least one of the displays 280; (17) report, on the user terminal, how many times people watched the triggered media content for at least a specified time period on at least one of the displays 280; and (18) report the time people spent in certain areas covered by sensors connected to the ALP system 120.

In an embodiment, the ALP cloud 310 creates rules or an AI model, and further creates media content according to a user's manual instructions and/or Artificial Intelligence (AI) assistance. The ALP cloud 310 may send the rules (or AI model) created to the ALP system 210 to enable the ALP system 210 to trigger the playing of media content by using the rules (or AI model) in a rule engine. The rules (or AI model) may define requirements (e.g. age group, gender, weather, etc.) for specific media content to be played. The term "rule" may be a set of principles which enables systems to make decisions based on given input. The input and action performed may depend upon the system in which rules (or the AI model) are stored.

In an embodiment, the ALP cloud 310 may update the rules (or AI model) and/or create new rules (or AI model) and send the updated and/or new rules (or AI model) to the ALP system 210 to update the set of rules (or AI model) stored in the ALP system 210. In an embodiment, the ALP cloud 310 may create the rules (or AI model) based on data received by the ALP cloud 310. Such data may include data received from the local system 120, such as from ALP system 210, and data received external from the local system 120. In an embodiment, the rules (or AI model) sent to the ALP system 310 may be created or updated using machine learning techniques performed by the ALP cloud 310.

In an embodiment, the ALP cloud 310 may create new media content using, for example, a set of rules or AI model stored in the ALP cloud 310. The ALP cloud 310 may send the media content created to the CMS 240 via the CMS cloud 340 to be stored by the CMS 240. Alternatively, the ALP cloud 310 may send the media content created to the CMS 240 directly to be stored by the CMS 240.

Figure 3:
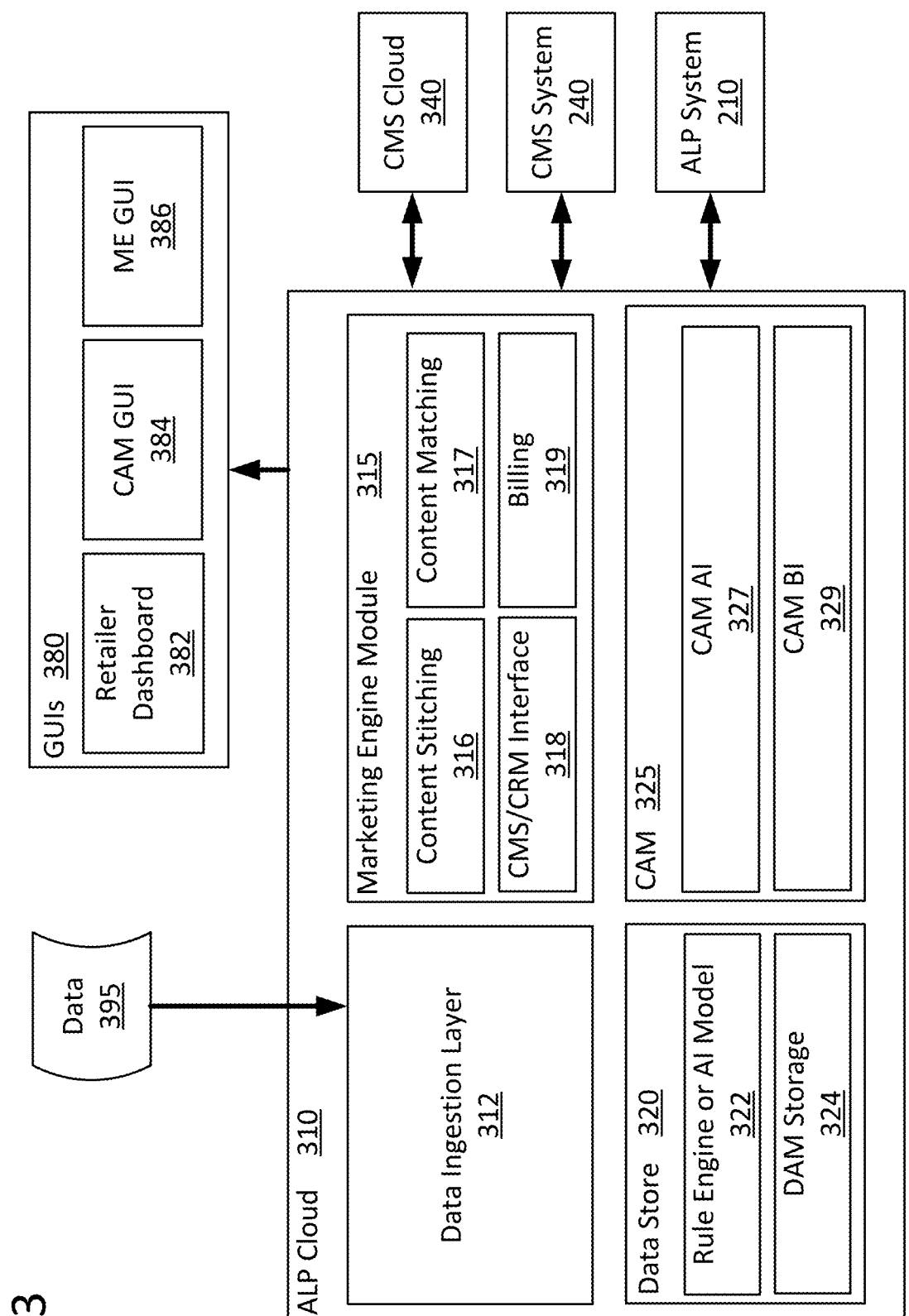
FIG. 3 is a diagram illustrating example functions of an ALP cloud of an embodiment.

With reference to FIG. 3, the ALP cloud 310 is described in further detail below. The ALP cloud 310 may comprise at least one processor and memory comprising computer programming code configured to cause the at least one processor to perform the functions of the ALP cloud 310.

FIG. 3 is a diagram illustrating example functions of the ALP cloud 310 performable by at least one processor of the ALP cloud 310 with memory of the ALP cloud 310. The memory may include computer program code configured to cause the at least one processor to perform the functions. As illustrated in FIG. 3, the ALP cloud 310 may provide modules of a data ingestion layer 312, a marketing engine (ME) module 315, data store 320, and customer analytics module (CAM) 325. The ME module 315 may include functions of content stitching 316, content matching 317, CMS/CRM interface 318, and billing 319. The data store may be memory that includes a rule engine or AI model 322, and includes a digital asset management (DAM) storage 324. The CAM 325 may include a CAM AI module 327 and a CAM BI module 329.

The data ingestion layer 312 may receive data 395 from different data sources (e.g. the local system 120 and external sources) as well as cleanse the data 395.

The CAM 325 may function as the analytics components of the remote system 130. The CAM 325 may encompass both in-store reporting and a big data application. Big data describes data sets that are large (both structured and unstructured) and complex, requiring advanced technologies to store, manage, analyze, and visualize information of value. In an embodiment, the CAM 325 may function to (1) enable retailers to measure and monitor store performance, understand consumer behavior, and implement beneficial actions: (2) perform analytic processing to optimize media content delivery to digital devices (e.g. displays 280) and measure impact, and (3) provide analytic support for the ME module 315. In an embodiment, the CAM 325 may import, manage, and store retailer and third-party data (both structured and unstructured). Various reporting, analytic models, and AI may process and analyze data to produce information and knowledge that enables decisions and actions to be undertaken to enhance the ability of retailers to understand the needs of their customers, predict their wants and demands, deliver relevant messages, measure and monitor impact, and otherwise aid in optimizing their use of resources.

In an embodiment, the CAM 325 may perform analysis using the rule engine or AI model 322, and perform functions of data mining and reporting. In an embodiment, by using the rule engine or AI model 322, the CAM 325 may provide information of value by a cycle of: converting data to information, to knowledge, to decisions, and then into actions that enable retailers to understand the needs of their customers, predict their wants and demands, and optimize their use of resources. Accordingly, the CAM 325 may accomplish the challenging task of managing and gaining insights from data, thereby securing a key competitive advantage.

In an embodiment, the CAM AI 327 may perform data analytics on real time data for media content creation and/or creating and updating an AI model or rules to be used by the ALP system 210, by applying data 395 ingested by the data ingestion layer 312 to the rule engine or AI model 322. The CAM AI 327 may interface with data ingestion layer 312 to receive real time data (hot path). The CAM 325 may also have an interface with the ME module 315. The CAM AI 327 may generate media content tags by applying the information from the data ingestion layer 312 to the rule engine or AI model 322, and provide these tags to the ME module 315 for further processing. For example, the tags may be applied to the ME module 315 to perform media content optimization by creating and selecting relevant media content for display. In an embodiment, the CAM AT 327 may create the tags as recommendations for creation of targeted media content to enhance in-store customer experience and provide promotional effectiveness that leads to more dollar sales per customer. In an embodiment, functions of the CAM 325 may be visualized and controlled via a CAM GUI 384 of the GUIs 380 that may be displayed on user terminal(s) 140 by the remote system 130.

The CAM BI 329 may generate various types of reports. Each of these report may be used to provide insights to individuals such as, for example, store retailers and marketers. The reports may be implemented with a retailer dashboard 382 and/or CAM GUI 384 of GUIs 380 that may be displayed on user terminal(s) 140 by the remote system 130. The reports may include reporting on, for example, store traffic, customer wait-time, store conversion rates, store productivity rates, and variances thereof. Additionally or alternatively, the reports may include reporting on, for example, customer insights (e.g. viewing analytics information) about customers in-store, zone traffic, inventory and operational enhancements, impression counts, opportunity to see (OTS) counts, media content viewer rate, media content efficiency rate, media content conversion rate, the time people spent in certain areas covered by sensors, and information concerning relationships between radio frequency identification (RFID) and display messages.

Store conversion refers to, for example, the number of individuals (e.g. customers) present in a particular store. Store productivity refers to, for example, revenue divided by a number of individuals present in a particular store. The reporting on demographics information may include the demographics information for the people who have watched a triggered media content for at least a predetermined time frame. The impression counts maybe counts on many times people watched a triggered media content for at least a predetermined time period. The OTS count may be a count of people who were determined to have had an opportunity to see media content on a display 280. For example, a count of people in front of display 280 that have both watched and not watched media content on the display 280.

The operational enhancements refer to, for example, detecting slow-moving inventory and detecting inventory approaching the end of its useful life. In an embodiment, the rule engine or AI model 322 may be used by the CAM AI 327 or the CAM BI 329 so as to determine and output operational enhancements based on the data 395 ingested by the data ingestion layer 312 and the ALP cloud 310, and the CAM BI 329 may cause the operational enhancements to be reported on one of the GUIs 380. For example, the ALP cloud 310 may recommend a specified inventory or promotion as an operational enhancement. Accordingly, some embodiments of the present disclosure may solve the problems retailers face in actively monitoring and promoting short-lived (like milk) and slow-moving product to maximize margins. Additionally, some embodiments of the present disclosure may avoid on-demand inventory not being managed well which may avoid a shortfall of inventory during peak-sale time periods, and may avoid poor inventory forecasting which may avoid reduced customer satisfaction resulting in downfall in the sale of products. In an embodiment, the CAM AI 327 or the CAM BI 329 may run the rule engine or AI model 322 on any periodical basis or any other basis to provide operational enhancements and other analytics. For example, the rule engine or AI model 322 may be run on a nightly or weekly basis.

The ME module 315 may store assets and static messages in the DAM storage 324. The assets may include audio, video, still photography, logo graphics, animations, etc., and similar elements. In an embodiment, the assets may be used as components to create media content that is used as finished advertising spots. The ME module 315 may create new media content by, for example, auto-generating them with the assets and static messages stored in the DAM storage 325, based on analytical insights from data ingested by the ALP cloud 310 and instructions. For example, the ME module 315 may auto-generate the new media content based on the media content tags, outputted by the rule set or the AI model 322 of the CAM AI 327, being used as recommendation. In an embodiment, after receiving a media content tag, the ME module 315 may, by using the content matching 317 function, determine whether media content already exists in the ALP cloud 310, the CMS system 240, and/or the CMS cloud 340 that matches the recommendation signaled by the media content tag and, if there is no matching media content, create new media content per the recommendation.

The creation of media content may be performed using the functions of content stitching 316 and content matching 317. Content stitching 316 may include combining different assets and/or static messages into a single new media content. Content matching 317 may include matching analytic input and guidance issued by the CAM 325 to determine the new media content to be created and/or the media content to played by the displays 280. Functions of the ME module 315 (e.g. media content creation) may be visualized and controlled via the ME GUI 386 of the GUIs 380 that may be displayed on a user terminal(s) 140 by the remote system 130. For example, a user may create and manage media content manually with the ME module 315, via the ME GUI 386.

The ME module 315 may deliver the new media content to the CMS 240. Alternatively, if there is matching media content, the ME module 315 may not create new media content and may send the matching media content to the CMS 240 if the CMS 240 already does not have the matching media content.

Figure 4:
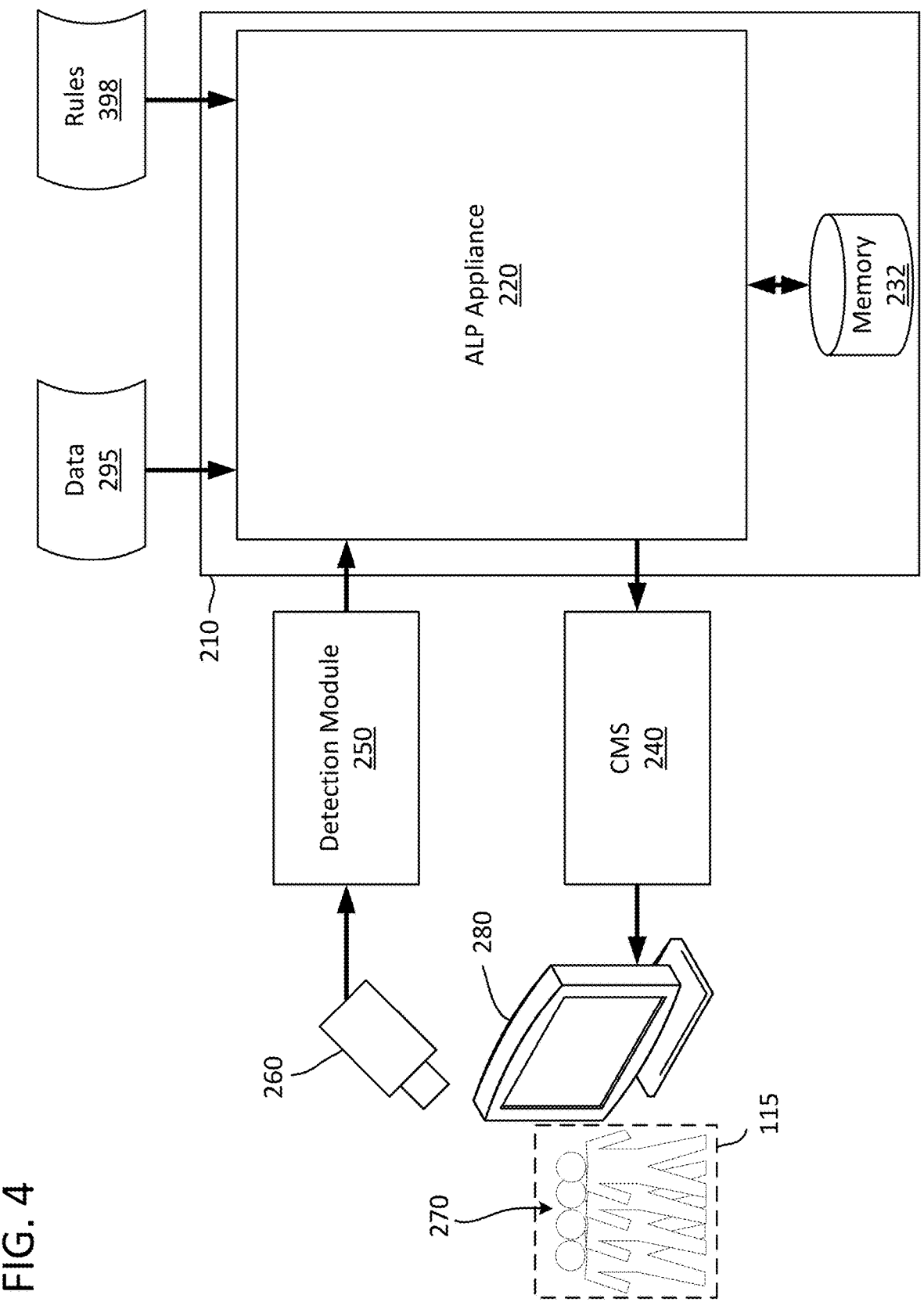
FIG. 4 is a diagram illustrating an ALP system of an embodiment and connected components.

With reference to FIGS. 2 and 4, components of the local system 120 (e.g. the ALP system 210 and/or the CMS 240) may be configured to perform any number of the following example functions in embodiments: (1) receive data from devices 290 that may include sensors and POS devices; (2) send the data from the devices 290 to the ALP cloud 310; (3) receive and store a rule set or AI model from the ALP cloud 310; (4) receive the data 295 from the external sources via the ALP cloud 310; (5) receive CMS playlist data from the ALP cloud 310 or the CMS cloud 340; (6) apply the data from the sensors, the data from the POS devices, the data 295 from the external sources, and the CMS playlist data to the rule set or the AI model received and stored; (7) select media content from the plurality of media content and a display from the displays 280, based on an output of the rule set or the AI model received and stored; and (8) output a trigger to play the media content selected on the display of the displays 280 selected.

For example, in an embodiment, the ALP system 210 determines what media content stored in the CMS 240 is to be played on one or more of the displays 280, wherein the determination is based on the ALP system 210 obtaining data and applying the data to rules 398 or an AI model stored in the ALP system 210.

With reference to FIGS. 2 and 4, the ALP system 210 may comprise an ALP appliance 220 and memory 232. The ALP appliance 220 may include at least one processor and memory. In an embodiment, the ALP appliance 220 may download the rules 398 or the AI model from the ALP cloud 310, and further receive data from the devices 290, which may be stored in memory 232.

The devices 290 may include, for example, one or more cameras 260 that send video data (e.g. camera images) to the ALP system 210 or the detection module 250. The devices 290 may also include, for example, mobile sensors, RFID, and beacons that provide sensor data to the ALP system 210 that the ALP system 210 may send to the ALP cloud 310 and/or apply to the stored rules 398 or the AI model. Such sensor data may also be received and used by the detection module 250 to perform its detection functions. Mobile sensors may be, for example, devices that detect MAC addresses of mobile devices in a detection area to count the number of devices as a traffic count. Beacons may be, for example, a Bluetooth Low Energy (BLE) device that broadcasts a signal which can be identified by other BLE devices in its vicinity. Beacons can be deployed individually or as a network. The devices 290 may also include POS devices which provide POS data to the ALP system 210 that the ALP system 210 may send to the ALP cloud 310 and/or apply to the stored rules 398 or the AI model.

As illustrated in FIG. 4, one or more of the cameras 260 of the devices 290 may be positioned nearby or integrated with one or more of the displays 280 to capture images of individuals 270 that may be viewing the one or more of the displays 280. Some of the cameras 260 may also be positioned away from the displays 280 at, for example, positions other than viewing positions of the displays 280. Each of the areas that are detected by the sensors (e.g. cameras 260), of the devices 290, may be a part of a respective specified zone 115 of a location 110, wherein the location 110 may have only one zone 115 or a plurality of zones 115. In an embodiments, one or more of the sensors may be directed to a single zone 115 of a location 110. In embodiments, some of the zones 115 may be visibility zones in which individuals 270 may view a display 280, and some of the zones 115 may be audibility zones in which individuals 270 may hear media content being played. In embodiments, one or more displays 280 may be inside or outside the zones 115. According to embodiments, each local system 120 may perform detection in a plurality of the zones 115 of a respective location 110, wherein any number of the zones 115 may be viewing positions of the displays 280 of the local system 120.

Figure 5:
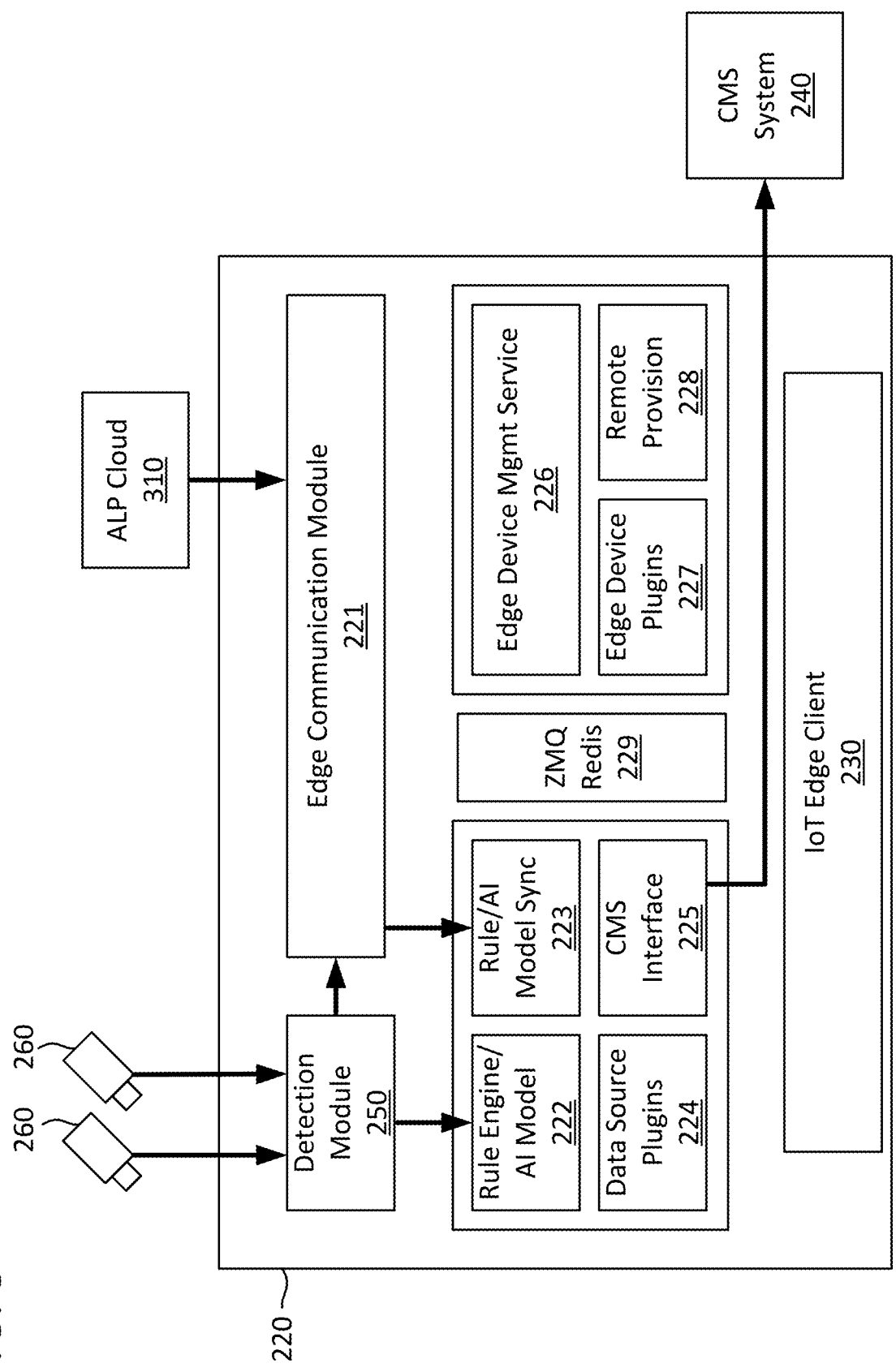
FIG. 5 is a diagram illustrating examples functions of an ALP appliance of an embodiment.

The ALP system 210, or a device communicating therewith, may process the video data to obtain demographics data (e.g. age group, gender, etc.) of one or more individuals 270 that is included in the video data. For example, the detection module 250 may process the video data to obtain the demographics data. The detection module 250 may also process the video data to obtain, for example, crowd count and dwell time of store traffic, orientation or line of sight of faces of the individuals 270. In an embodiment, the detection module may generate analytics data containing at least a date The detection module 250 may be implemented by at least one processor with memory external to the ALP system 210, as illustrated in FIG. 4, or implemented by the ALP system 210 as illustrated in FIG. 5. The detection module 250 may include facial detection or recognition software. In order to maintain customer anonymity, the detection module 250 may perform detection functions, without recognition functions, to obtain anonymous video analytics. Demographics data refers to the characteristics that define who a target audience is. For example, characteristics such as age, gender, ethnicity, cultural background, religious or political affiliations, economic status, family background, and group memberships may the demographics data obtained. Dwell time refers to a measurement of how long individuals are present in front of a display 280.

The ALP system 210 may apply the demographics data to the stored rules 398 or AI model to determine which content stored in the CMS 240 is to be played on one more of the displays 280. In some embodiments, the ALP system 210 may also download data 295 from the ALP cloud 310 and apply it to the stored rules 398 or the stored AI model. The data 295 downloaded may include, for example, event data, weather data, and POS data. Event data may be, for example, data about past and/or future local events, sports games (e.g. the results of the games), etc.

After reaching a determination of which content is to be played, the ALP system 210 may send a signal to the CMS 240 to play the content on one or more of the displays 280. The signal may be, for example, an instruction that triggers one or more specific media content of the media content to play.

In some embodiments, the ALP system 210 may also upload data to the ALP cloud 310 for analysis, reporting, rule set or AI model updating, and other uses by the ALP cloud 310. The data uploaded may include all or some of the information obtained by the detection module 250, all or some of the other information obtained by the ALP appliance 220.

FIG. 5 illustrates example functions of the ALP appliance 220 performable by at least one processor of the ALP appliance 220 with memory (e.g. memory 232) of the ALP system 210. The memory may include computer program code that is configured to cause the at least one processor to perform the functions. As illustrated in FIG. 5, the ALP appliance 220 may provide modules of a detection module 250, edge communication module 221, rule engine/AI model 222, rule sync 223, data source plugins 224, CMS interface 225, edge device management service 226, edge device plugins 227, remote provision 228, ZMQ and Redis 229, and Internet of Things (IoT) edge client 230.

As illustrated in FIG. 5, the detection module 250 may be implemented with the ALP appliance 220 rather than as a separate component as illustrated in FIG. 4.

The edge communication module 221 may be a module for communication with the remote system 130, including the ALP cloud 310 and the CMS cloud 340. For example, the ALP appliance 220 may retrieve new or updated rules or a new or updated AI model using the edge communication module 221. The ALP appliance may also upload data to the ALP cloud 310 using the edge communication module 221.

The ALP appliance 220 may implement the new rules/AI model with the rule engine/AI model 222 used to determine content to be played, and may update the rule engine/AI model 222 by synchronizing the rule engine/AI model 222 with new or updated rules/AI model received by the edge communication module 221. In an embodiment, the rule engine/AI model 222 may be ran with a limited set of data including, for example, a limited set of demographics data and a limited set of external data. It should be appreciated that the ALP cloud 310 of the remote system 130 may receive data from multiple local systems 120 and also receive external data from outside the system. Accordingly, unlike some embodiments of the ALP cloud 310 and its rule engine or AI model 322, the ALP appliance 220 may not function as a big data analytics solution in some embodiments.

The data source plugins 224 and the edge device plugins 227 may be plugins for retrieving data from devices 290 including, for example, sensors, beacons, and RFID. The CMS interface 225 may interface the ALP appliance 220 with the CMS 240.

The ALP appliance 220 may include the edge device management service 226, edge device plugins 227, and remote provision 228 to accomplish the function of device management. For example, the edge device management service 226 may be used to update the other functions of the ALP appliance 220 including, for example, data source plugins 224 and the rule engine/AI model 222. Also, the remote provision 228 may be used for remote login to the ALP appliance 220 for troubleshooting and management of the ALP appliance 220.

The ZMQ and Redis cache may be used by the ALP appliance 220 to ingest and store data from different sources (e.g. the ALP cloud 310, devices 290, and detection module 250) for further processing.

The IoT edge client 230 may function as a machine to machine (M2M) client and as a pipeline for sending data, including detection module data and data from devices 290 to the ALP cloud 310.

With reference to FIG. 2, the CMS 240 may be a system that downloads media content from the ALP cloud 310 and/or the CMS cloud 340, stores the media content in memory of the CMS 240, and causes at least one display of the displays 280 to play at least one media content of the media content, based on the signal from the CMS 240. The CMS 240 may comprise at least one processor and memory comprising computer programming code configured to cause the at least one processor to perform the functions of the CMS 240.

In an embodiment, the CMS 240 may send a proof of delivery (PoD) notification to the ALP cloud 310 indicating that the CMS 240 has received the content from the ALP cloud 310 and/or the CMS cloud 340. The CMS 240 may send the PoD notification directly to the ALP cloud 310 or to the ALP cloud 310 via the CMS cloud 340. In an embodiment, the CMS 240 may send the PoD notification to the ALP system 210, and the ALP system 210 may send the PoD notification to the ALP cloud 310. In an embodiment, the CMS 240 may send information to the ALP system 210 that indicates a list of the media content stored in the memory of CMS 240. The frequency or timing when the CMS 240 sends such information to the ALP system 210 may be set at the CMS 240, and such sending of information can be used as an inventory check of the CMS 240. In an embodiment, the CMS 240 may send the information once a day. In an embodiment, the CMS 240 may send a proof of play (PoP) notification to one or more of the ALP system 210, the ALP cloud 310, and the CMS cloud 340, the PoP notification indicating that media content has been played on at least one of the displays 280. For example, the PoP may be a reporting mechanism in which logs are used to show that media content (e.g. an advertisement) actually played back on one or more of the displays 280. In an embodiment, the PoP notification may include at least a date and time of play of media content, and an ID of the media content played.

Figure 6:
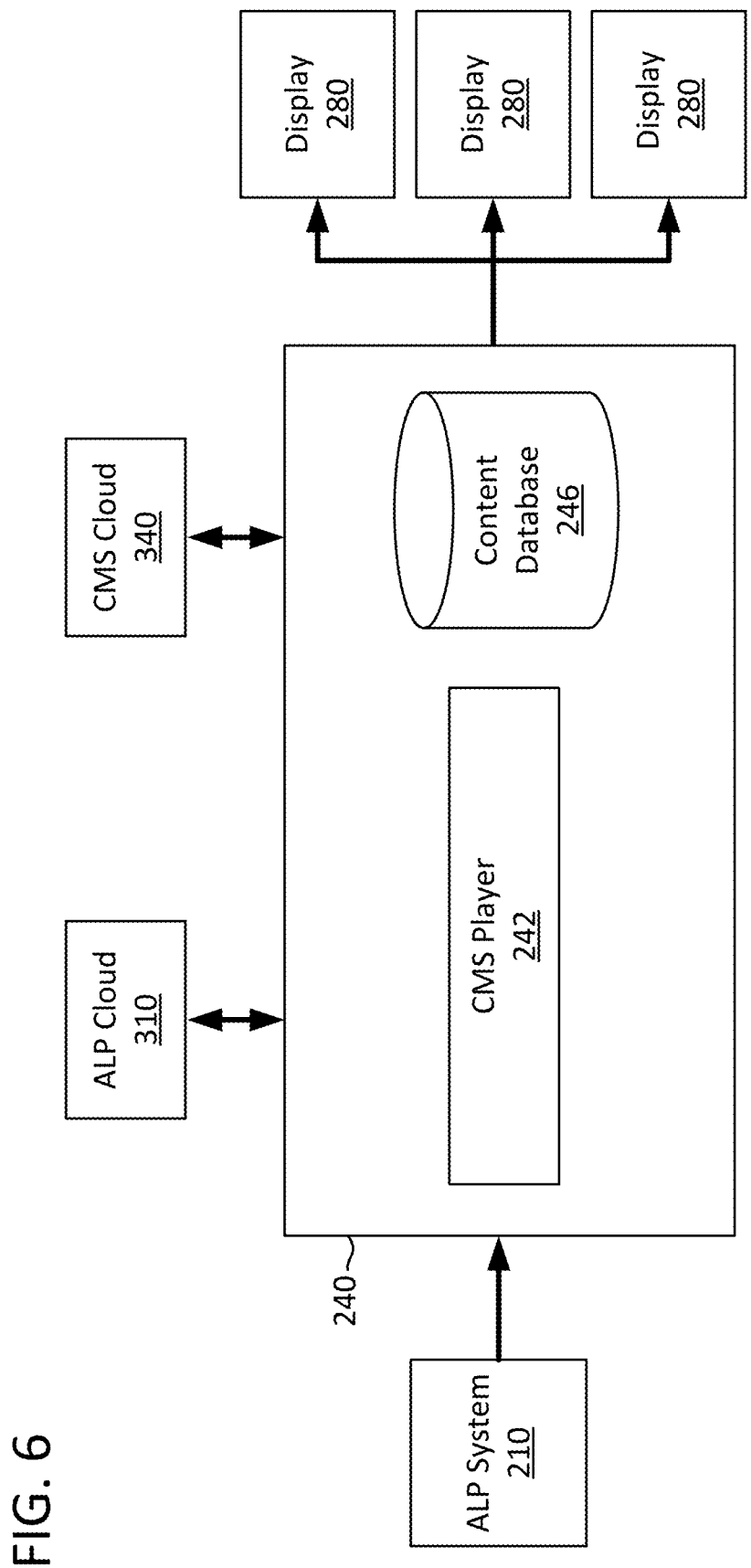
FIG. 6 is a diagram illustrating a CMS of an embodiment and connected components.

FIG. 6 illustrates an example embodiment of the CMS 240, wherein the CMS 240 comprises at least one CMS player 242 and a content database 246. The CMS player 242 may include at least one processor and memory comprising computer program code configured to cause the at least one processor to perform the functions of the CMS 240. The content database 246 may be memory that includes the media content that the CMS player 242 may cause to play on one or more of the displays 280.

Details of use and generation of the AI models and rules of the present disclosure are described below.

The AI models of the present disclosure may be built over an understanding of the relationships between various data points, as determined by analytical processes. AI models of the present disclosure may be built and updated using machine learning processes. For example, in an embodiment, the ALP cloud 310 may configured to run machine learning processes to build and update an AI model used by the ALP cloud 310 and an AI model or rule set used by the ALP system 210. The machine learning processes may use supervised or un-supervised learning techniques based on the kind of data inputted to the AI models.

Figure 7:
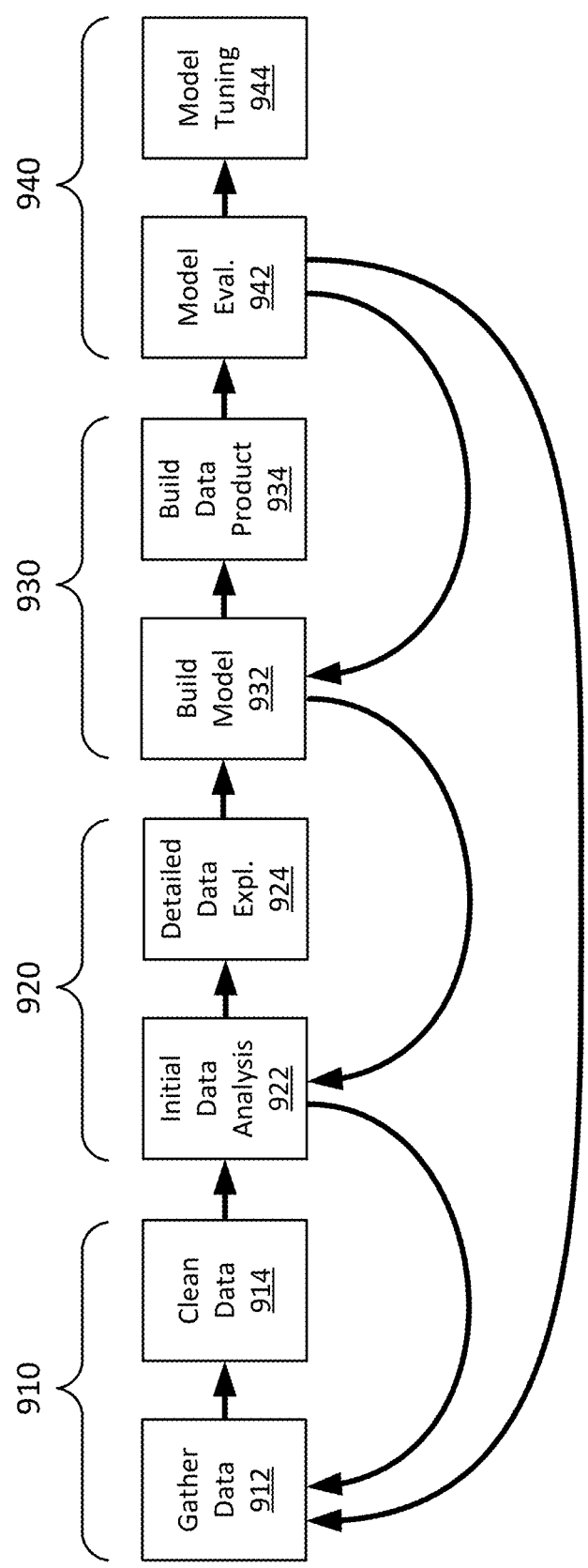
FIG. 7 is a diagram illustrating a machine learning process flow of an embodiment.

As illustrated in FIG. 7, the machine learning process flow may include a plan segment 910, an explore segment 920, a build segment 930, and an evaluate segment 940. The plan segment 910 may accomplish identifying the input data and framing the problem-solving approach. For example, the plan segment 910 may include a gather data step 912 and a clean data step 914. The explore segment 920 may accomplish assessing data structure and creating hypotheses, sample data, checking the statistical properties of the sample, and performing statistical tests of hypotheses. For example, the explore segment 920 may include an initial data analysis step 922 and a detailed data exploration step 924. The build segment 930 may accomplish understanding technicalities of each algorithm and how it works on a particular set of data, and ensuring that the model satisfies findings in the initial data analysis step 922. For example, the build segment 930 may include a build model step 932 and a build data product step 934. The evaluate segment 940 may accomplish applying methods to validate the created model by, for example, evaluating the models ability to perform and tuning the model. For example, the evaluate segment 940 may include a model evaluation step 942 and a model tuning step 944. In an initial phase of the model evaluation step 942, the AI model may target to maximize the lift with respect to, for example, impression, dwell time, conversion rate, and productivity. At further phases of the model evaluation step 942, the AI model may target to maximize the lift for other aspects including, for example, impression quality, opportunity to see (OTS). SNS review, and engagement level.

Figure 9:
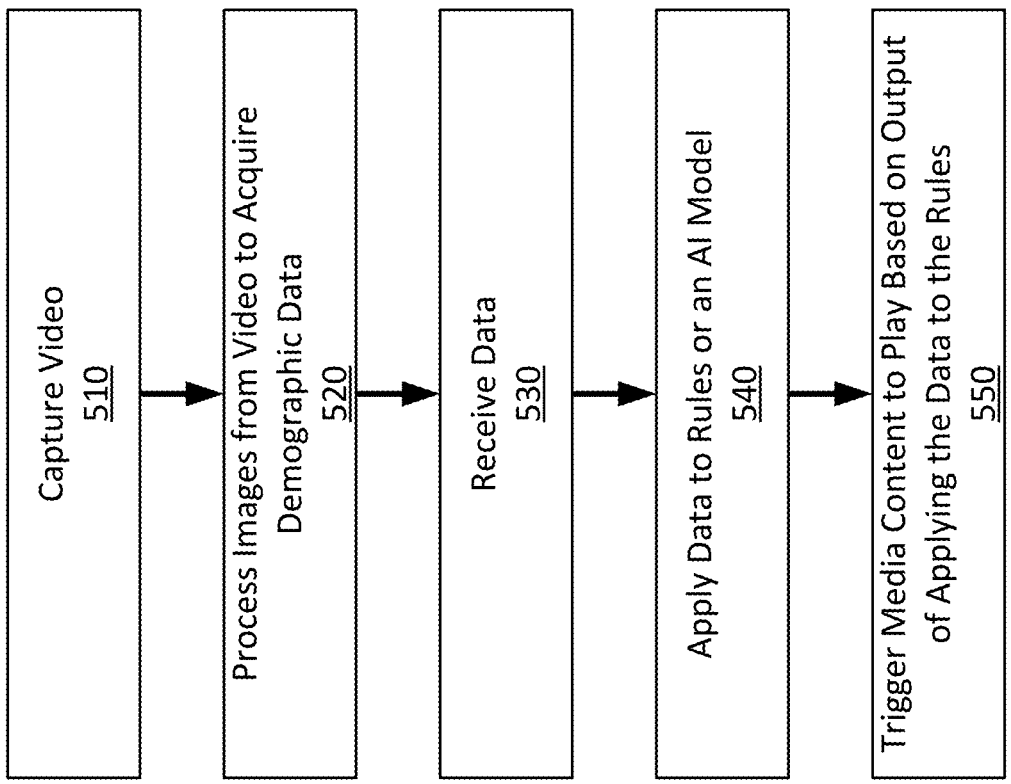
FIG. 9 is a diagram illustrating a method of the present disclosure.

As illustrated in FIG. 9, the process may loop back to the gather data step 912 from the initial data analysis step 922, the process may look back to the initial data analysis step 922 from the build model step 932, the process may loop back to the build model step 932 from the model evaluation step 942, and the process may look back to the gather data step 912 from the model evaluation step 942.

AI models and rule sets of the present disclosure may be configured to accept various inputs and to output information. For example, AI models and rules sets of the present disclosure may accepts inputs such as demographics information, store traffic information, crowd count information, wait time, weather information, point of sales (POS) information, catalog information, inventory information CRM information, event information, display location information, store information, retailer digital data, proof of play or proof of delivery information, media content tags, sensor data, promotion data.

Demographics data refers to the characteristic of individuals 270 that define who a target audience is. For example, characteristics such as age, gender, ethnicity, cultural background, religious or political affiliations, economic status, family background, and group memberships may be the demographics data obtained. In embodiments, the detection 250 module may obtain the demographics data. The demographics data may be applied to the rules or AI model to generate analytical reports based on demographics of people visiting a location 110, and to generate or trigger a targeted media content based on the demographics and other related details.

Store traffic information may be, for example, information that comes from a camera 260 placed at an entrance of a location 110 concerning the amount of people entering the location 110. Crowd count information may be, for example, a count of people in a specified zone 115 of a location 110 (e.g. in front of a display 280). Store traffic information and crowd count information may be applied to the rules or AI model to generate analytical reports based on demographics of people visiting a location 110, and to generate or trigger a targeted media content based on the demographics and other related details.

Wait time may be, for example, data about how long individuals 270 have been waiting in a queue of any zone 115 of a location 110. Wait time data may be applied to the rules or AI model to generate analytical reports based on demographics of people visiting a location 110, to generate or trigger a targeted media content based on the demographics and other related details, generate an alert to staff to check for customer needs based on customer wait time crossing a threshold, and creating and displaying a target media content with offers and discounts based on high wait time and relevant static.

Weather information may include, for example, weather data based on zip code. Weather information may be applied to the rules or AI model for predictive analysis and for dynamic media content creation or triggering based on analytics of weather data along with other data.

POS information may include, for example, a retailer's data for transactions happening over a POS machine. POS information may include, for example, customer purchase history based on transaction data, location of purchase, items purchased and corresponding quantity, customer purchasing habits, retail store sales information, store conversion rate. POS information may be applied to the rules or AI model to generate analytical reports based on demographics of people visiting a location 110, and to generate or trigger a targeted media content based on the demographics and other related details.

Catalog information may include, for example, a retailer's product catalog data, that includes details of products and their pricing information. Campaign data may also be provided with the product catalog data, wherein the campaign data is data for special events or a specific time of the year. Inventory information may include, for example, inventors' data of a retailer's location 110 and supply chain data. Catalog information may be applied to the rules or AI model to create or trigger media content based on product offerings in the catalog information, wherein offer, discount, up selling, and cross-selling messages may be included based on the analytics and the product catalog. The campaign information may be applied to the rules or AI model to create or trigger media content based on a campaign ran by the retailer.

CRM information may include, for example, customer related data such as customer location and loyalty information. Such information may come from, for example, a retailer's CRM or loyalty program data. CRM information may be applied to the rules or AI model in analytics based on customer demographics like age and gender, customer location information (e.g. zip code) that provides information about purchasing habits about people living in certain localities, and customer purchase history and preferences based on, for example, a loyalty program.

Event information may be, for example, data about past and/or future local events, sports games (e.g. the results of the games), etc. Event information may be applied to the rules or AI model to perform the predictive analysis based on past events, to create reports based on event data matched with sales, weather, location, etc., and to create and trigger media content based on the events.

Display location information may be, for example, information about a specific location of a display 280 within a store. Display location information may be applied to the rules or AI model to generate analytical reports based on demographics of people visiting a location 110, and to generate or trigger a targeted media content based on the demographics and other related details.

Store information may be, for example, information about a retailer's location 110 (e.g. store). For example, store information may include data of (1) location of the store, along with purchasing habits of people in that locality; (2) weather conditions around the store location; (3) Events happening around the store location; and (4) distance from other competitive stores. The store information may be applied to the rules or AI model to perform analytics based on the store data, and corresponding sales, weather, events, store traffic, and other data. As well as for creating and trigger media contents based on the data.

Retailer digital data may be, for example, data stored by a location 110 concerning a specific customer. For example, the data may include specific themes, images, videos, etc. for each specific customer in which data is provided. The retailer digital data may be applied to the rules or AI model to create and trigger messages utilizing the specific themes, images, videos, etc.

Sensor data may include, for example, RFID and beacon data. RFID data may include information relating to tracking products in a store that are tagged with RFID tags. Beacon data may include information related to location of customers maneuvering inside a store. Promotion data includes, for example, information about promotions applied on products within the location 110. The sensor data may be applied to the rules or AI model to generate analytical reports based on demographics of people visiting a location 110, and to generate or trigger a targeted media content based on the demographics and other related details. Additionally, the beacon data may be applied to the rules or AI model to build relation between a customer's in-store location, with other customer related data coming from other input sources (e.g. CRM, detection module 250, RFID, and locations of displays 280).

The AI models and rules sets of the present disclosure may output any type of information that may be used for selecting media content to display or creating media content, including the media content tags. In an embodiment, the media content tags may be media content creation recommendations and message creation recommendations.

The media content tags may include, for example, meta-tags that are information associated with an asset in the form of simple keywords. The meta-tags may be a subset of metadata and may be used for the purposes of denoting the subject matter of the asset. In an embodiment of the present disclosure, a media content tag may include, a probability factor, media content meta-tag, a product stock keeping unit (SKU) information, a product meta-tag, age information, gender information, weather information, and event ID information. The media content meta-tag may be a unique ID that identifies media content. The product meta-tag may be a unique tuple that identifies a product including, for example, the department, classification, and category of the product. The age information may be an age of a customer for whom the media content is targeted. The gender information may be a gender of a customer for whom the media content is targeted. The weather information may weather information for which the media content is targeted. The event information may be information for which the media content is targeted. The media content tags generated may be used by the ALP cloud 310 to generate optimized media content and trigger the playing of media content, and by the ALP system 210 to trigger the playing of media content.

An example of a media content tag for media content creation is provided below.

```
{
    <Hit Probability> 90%
    <Product SKU>
    <Asset Meta-tag> {Fashion, Coat, North Face}
    <age> 25-35
    <gender> Female
    <DS ID> DS101
},
{
    < Hit Probability> 50%
    <Product SKU>
    <Asset Meta-tag> {Fashion, Shoes, Adidas}
    <age> 25-35
    <gender> Female
    <DS ID> DS 101
}
```

Another example of a media content tag for media content creation, generated using different input data, is provided below.

```
{
    <Hit Probability> 70%
    <Product SKU>
    <Asset Meta-tag> {Toys & Games, Video Games, PS4}
    <age> 15-25
    <gender> Male
    <DS ID> DS120
},
{
    <Hit Probability> 50%
    <Product SKU>
    <Asset Meta-tag> {Fashion, Polo, USPA}
    <age> 15-25
    <gender> Male
    <DS ID> DS120
},
{
    <Hit Probability> 30%
    <Product SKU>
    <Asset Meta-tag> {Fashion, Shades, Ray Ban}
    <age> 15-25
    <gender> Male
    <DS ID> DS120
}
```

An example of a media content tag for media content selection is provided below.

```
{
    <Hit Probability> 90%
    <Product SKU>
    <Message Meta-tag> MSG-2061 (it could be {Fashion, Coat, North Face})
    <age> 25-35
    <gender> Female
    <DS ID> DS101
},
{
    <Hit Probability> 50%
    <Product SKU>
    <Product Meta-tag> MSG-2761 (it could be {Fashion, Shoes, Adidas})
    <age> 25-35
    <gender> Female
    <DS ID> DS101
}
```

Another example of a media content tag for media content selection, generated using different input data, is provided below.

```
{
    <Hit Probability> 70%
    <Product SKU>
    <Product Meta-tag> MSG-101 {Toys & Games, Video Games, PS4}
    <age> 15-25
    <gender> Male
    <DS ID> DS120
},
{
    <Hit Probability> 50%
    <Product SKU>
    <Product Meta-tag> MSG-161 ({Fashion, Polo, USPA})
    <age> 15-25
    <gender> Male
    <DS ID> DS120
},
{
    <Hit Probability> 30%
    <Product SKU>
    <Product Meta-tag> MSG-186 ({Fashion, Shades, Ray Ban})
    <age> 15-25
    <gender> Male
    <DS ID> DS120
}
```

In an embodiment, the outputted media content tags may also be the inputs of the AI models. For example, the media content tags may be output by the CAM AI 237, illustrated in FIG. 3, for retraining the AI model(s) used by the CAM AI 237 and the AI model(s) to be used by the ALP system 210. In an embodiment, the AI model(s) may be retrained to achieve a specified level of lift, which may be a measure of performance of the AI model. The term "lift" refers to a ratio of target response divided by average response.

Figure 8:
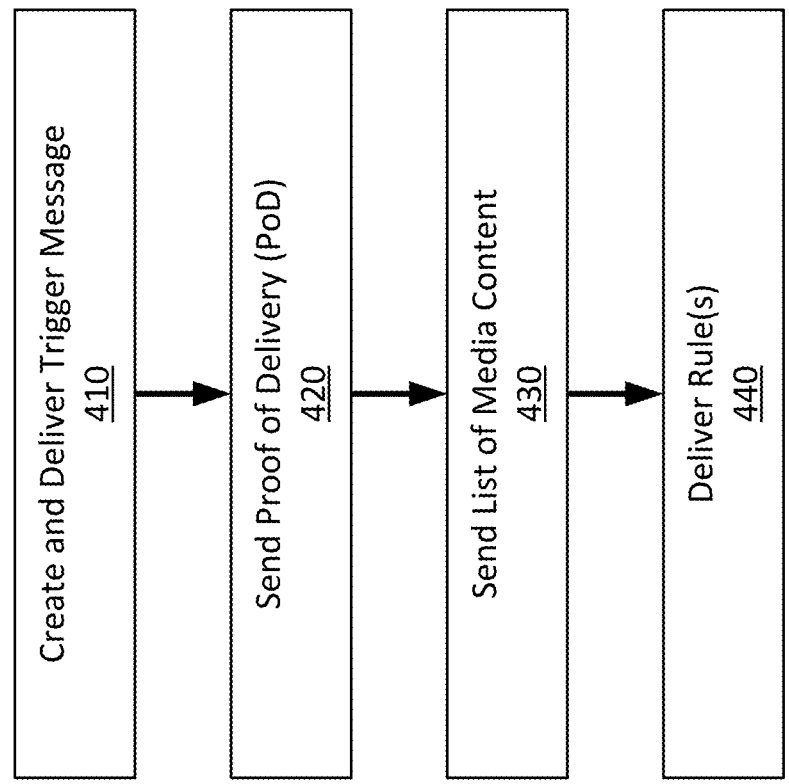
FIG. 8 is a diagram illustrating a method of the present disclosure.

Embodiments of the present disclosure may accomplish the method illustrated in FIG. 8. For example, referring to the embodiment illustrated in FIG. 2, the ALP cloud 310 may create one or more media content according to manual instructions of a user using a user terminal 140, or according to rules or an AI model stored in the ALP cloud 310, and deliver the media content to the CMS 240 via the CMS cloud 340 (step 410). Following, the CMS 240 may send a proof of delivery notification to the ALP cloud (step 420). The CMS 240 may also send a list of the media content stored in the CMS 240 to the ALP system 210 (step 430). The ALP cloud 310 may deliver a rule(s) or an AI model to the ALP system 210 that may be stored and used by the ALP cloud 310 to trigger certain media content to be played based on inputs to the rule(s) or the AI model.

In an embodiment, step 440 may be executed after step 420 to avoid triggering, before the CMS 240 receives the media content, the attempted playing of the media content based on the delivered rule(s) or AI model. In such a case, step 430 may be omitted. In an embodiment, the ALP system 210 can send an instruction to the CMS 240 as a trigger to display a specific media content on one or more displays 280 only if the specific media content is included in the list of media content received by the ALP system 210 in step 430. For example, the ALP system 210 may determine a media content to play based in part on the list of media content received. In such a case, step 420 may be omitted.

Embodiments of the present disclosure may accomplish the method illustrated in FIG. 9. For example, referring to FIGS. 2 and 5, one or more cameras 260 may capture video, including images of at least one of the individuals 270 (step 510). Following, the detection module 250 may process the images from the video to acquire demographic data of the at least one of the individuals 270 (step 520). Additionally, the ALP system 210 may receive external data 295 from the ALP cloud 310 and other data from devices 290 (e.g. mobile sensor data, RFID data, beacon data) (step 530), and apply such data to rules or an AI model stored in the ALP system 210 (step 540). In an embodiment, the ALP system 210 may apply at least the demographic data acquired to the rule engine/AI model 222, the rule engine containing the rules. The ALP system 210 may trigger a specified media content to play based on an output of the rules or the AI model (step 550). For example, the ALP system 210 may send an instruction to the CMS 240 as a trigger to display the specified media content on one or more of the displays 280 connected to the CMS 240.

FIGS. 10A-E illustrate diagrams for demonstrating a sequence of interactions between the ALP system 210 and the CMS 240 of an embodiment, for triggering the playing of media content when the CMS 240 is currently playing media content in accordance with a CMS playlist 600.

In an embodiment, the CMS 240 may be configured to create and schedule a CMS playlist 600 to be played by one or more of the displays, and manage the media content list within the CMS playlist 600. The ALP system 210 may be configured to send a trigger to the CMS 240 for selecting a media content that resides within or outside the CMS playlist 600 for playing.

Based on information received from various data sources, the ALP system 210 selects the appropriate media content to be played and sends a trigger every predetermined time interval (e.g. every 1 second) to the CMS 240 to play a media content. The CMS 240 may ignore the triggers until a predetermined time period before a currently played media content ends, wherein the predetermined time period can be changed based on performance of the system. For example, with reference to FIG. 10A, the CMS 240 may accept a trigger at (N−1)th second of a currently played media content 610, wherein N is the length of the media content, and ignore the triggers received before the (N−1)th second of the currently played media content 610.

Based on the trigger being accepted, the CMS 240 may play the media content for which it has received the trigger. For example, with reference to FIG. 10B, the CMS 240 may play the media content 620 if the trigger received at (N−1)th second of the media content 610 played in FIG. 10A is for media content 620.

In case the CMS 240 does not receive a trigger at (N−1) sec of a currently played media content, the CMS 240 may accept the trigger received at a different predetermined time frame (e.g. (N−2) sec of a currently played media content) and play the media content referenced by the trigger, wherein such predetermined time period can be changed based on performance of the system. However, if the CMS 240 does not receive a trigger at the different time frame (e.g. (N−2) sec of a currently played media content), the CMS 240 may cause a next media content in the CMS playlist 600 to be played based on rules. For example, the CMS 240 may cause a lowest ordered media content of the CMS playlist 600 to play that was not previously played, a lowest ordered media content of the CMS playlist 600 to play that was not previously automatically triggered by the ALP system 210, or the next ordered media content of the CMS playlist 600 relative to the presently played media content. For example, with reference to FIG. 10C, the CMS 240 may play media content 630, the second media content in the CMS playlist 600, since media content 630 is the earliest media content in the CMS playlist 600 that has not been previously played. Additionally, with reference to FIG. 10D, the CMS 240 may play media content 640, the third media content in the CMS playlist 600, in a case where a trigger was not received at (N−1) sec and (N−2) sec of the played media content 630.

In further reference to FIG. 10D, based on the trigger not being received at (N−1) sec of the played media content 640 but a trigger being received at (N−2) sec of the played media content 640, the CMS 240 may play the media content for which it has received the trigger. For example, with reference to FIG. 10E, the CMS 240 may play the media content 650 if the trigger received at (N−2)th second of the media content 640 played in FIG. 10D is for media content 650.

Figure 11:
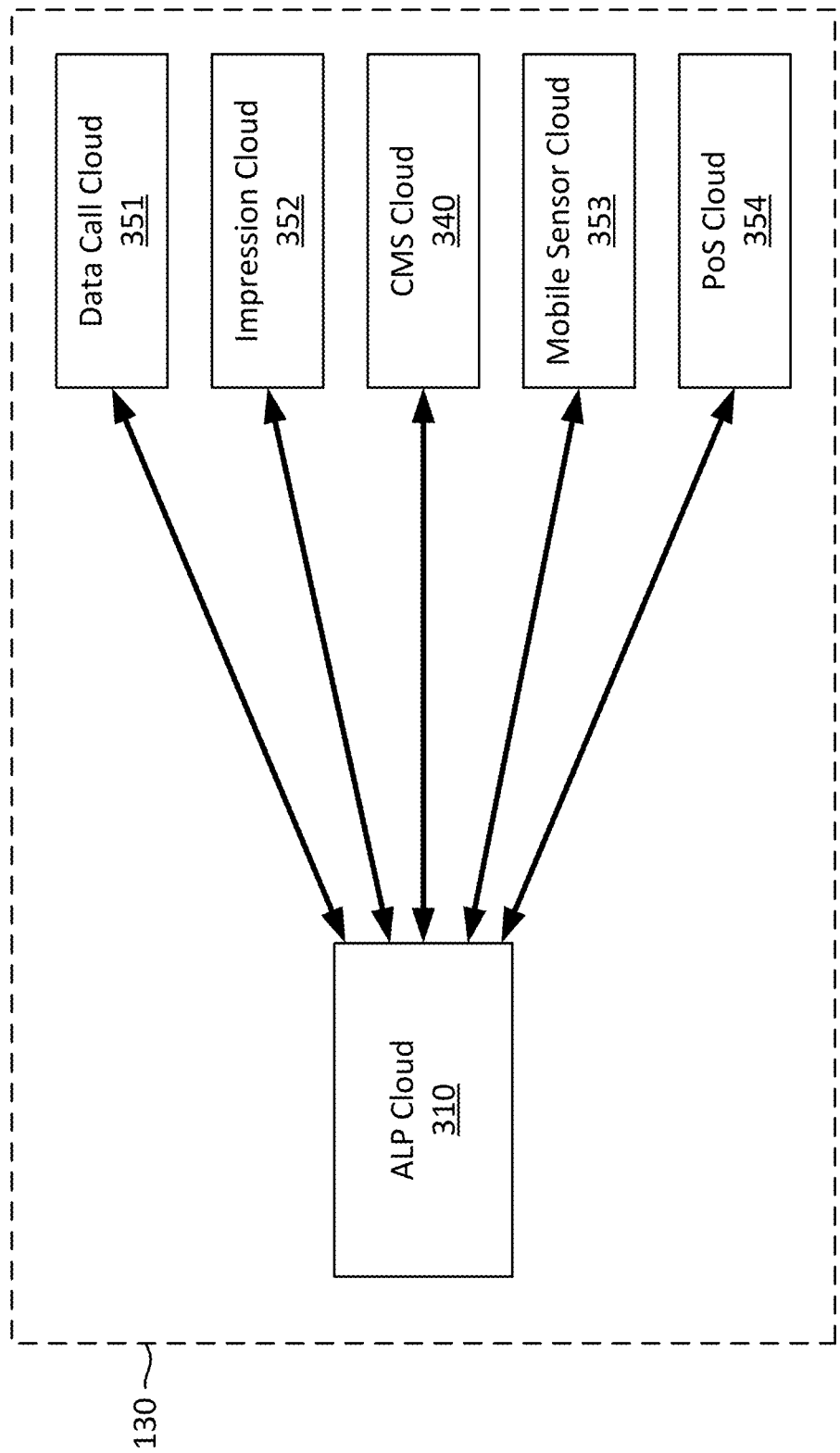
FIG. 11 illustrates a modified embodiment of the remote system illustrated in FIG. 2.

FIG. 11 illustrates a modified embodiment of the remote system 130 illustrated in FIG. 2. As illustrated in FIG. 11, the remote system 130 may further include a data call cloud 351, an impression cloud 352, a mobile sensor cloud 353, and a PoS cloud 354. Such clouds may be respective cloud computer environments, each implemented with at least one processor with memory to perform the functions of the cloud. Each of such clouds may be configured to receive, generate, and/or store a respective type of data that may be sent to and used by the ALP cloud 310. For example, the data call cloud 351 may receive, generate, and/or store local information. The impression cloud 352 may receive, generate, and/or store impression data. The mobile sensor cloud 353 may receive and/or store mobile sensor data including, for example, mobile sensor data from one or more mobile sensors of the devices 290, provided in one or more of the local systems 120. In an embodiment, the mobile sensors may be in direct communication with the mobile sensor cloud 353 via internet by using a cellular network. The PoS cloud 354 may receive, generate, and/or store PoS information.

In an embodiment, the ALP cloud 310 may be configured to perform remote communication with the data call cloud 351, the impression cloud 352, the mobile sensor cloud 353, and the PoS cloud 354 to receive data that may be used by the CAM 325 of the ALP cloud 310 to perform any of its functions (e.g. media content creation, media content triggering, and reporting). For example, the CAM 325 may use the CAM BI 329 module to display the retailer dashboard 382, the CAM GUI 384, or other GUIs with visualizations of data received from the data call cloud 351, the impression cloud 352, the mobile sensor cloud 353, and the PoS cloud 354, along with data received from the local system(s) 120.

Example embodiments of locations 110, zones 115, and cameras 260 are described below.

Figure 12:
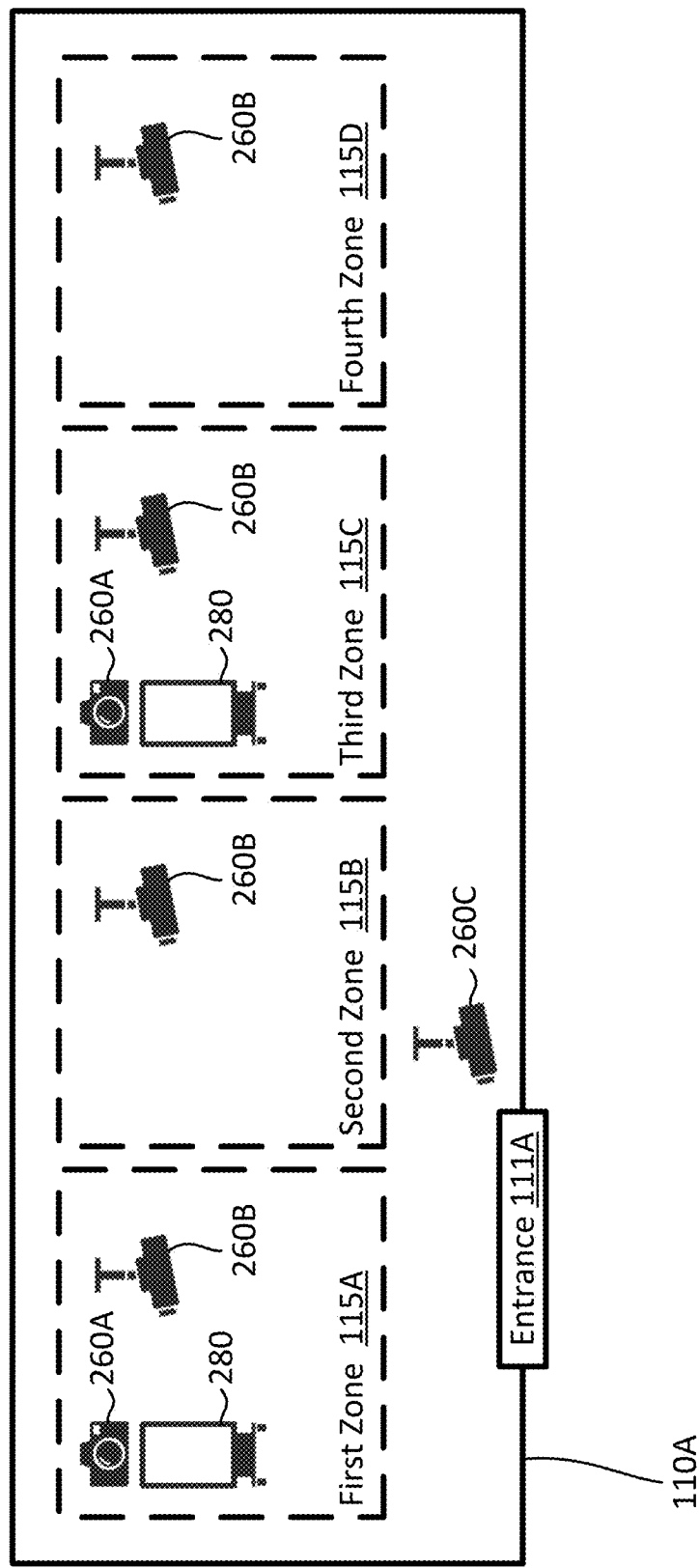
FIG. 12 illustrates a first example embodiment of a location, zones, and cameras.
Figure 13:
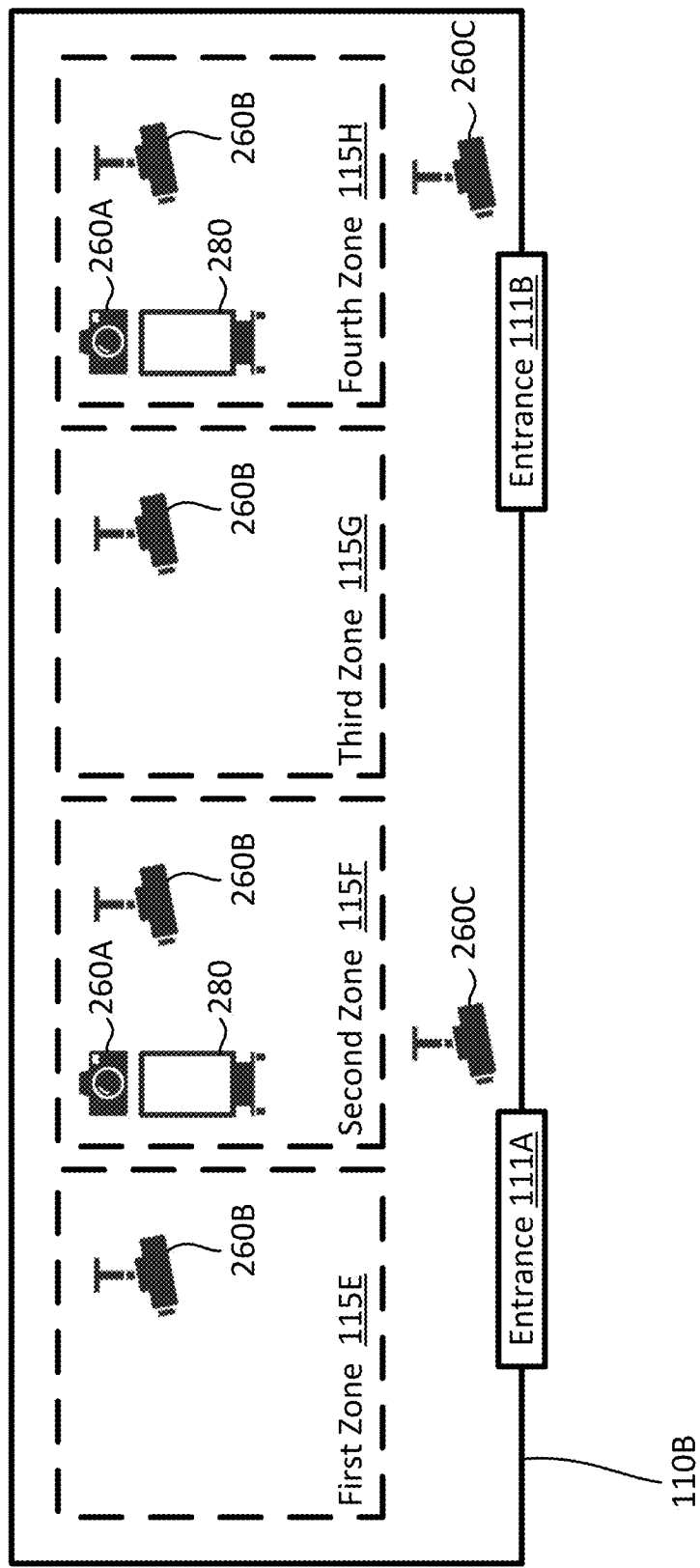
FIG. 13 illustrates a second example embodiment of a location, zones, and cameras.

As previously described with reference to FIGS. 1, 2, and 4, each of the locations 110 may include one or more zones 115, one or more devices 290 (e.g. cameras 260) may be inside or outside the zones 115, and one or more displays 280 may be inside or outside the zones 115. With reference to FIGS. 12-13, cameras 260 may include, for example, target cameras 260A, zone traffic cameras 260B, and location traffic cameras 260C that have different configurations with respect to locations and their zones. The locations 110 and the zones 115 may be considered types of locales. Another type of locale may be a specific one or more of display 280.

For example, as illustrated in FIG. 12, a location 110A may include a first zone 115A, a second zone 115B, a third zone 115C, and a fourth zone 115D. The first through fourth zones 115A-D may each include a zone traffic camera 260B. The first zone 115A and the third zone 115C may each include a target content camera 260A and a display 280. The location 110A may further include a location traffic camera 260c facing an entrance 111A.

As another example, illustrated in FIG. 13, a location 110B may include a first zone 115E, a second zone 115F, a third zone 155G, and a the fourth zone 115H. The first through fourth zones 115E-H may each include a zone traffic camera 260B. The second zone 115F and the fourth zone 115H may each include a target media content camera 260A and a display 280. The location 110B may further include a location traffic camera 260C facing an entrance 111A and another location traffic camera 260c facing an entrance 111B.

Each of locations 110 may be associated with an identifier. For example, location 110A may have a store ID "1", and location 110B may have a store ID "2". Each of the zones 115 within a location 110 may also be associated with an identifier. For example, with respect to location 110A, the first zone 115A may have a zone ID "1a", the second zone 115B may have a zone ID "1b", the third zone 115C may have a zone ID "1c", and the fourth zone 115D may have a zone ID "1d". With respect to location 110B, the first zone 115E may have a zone ID "2a", the second zone 115F may have a zone ID "2b", the third zone 115G may have a zone ID "2c", and the fourth zone 115H may have a zone ID "2d".

The identifiers may be used by the ALP system 210 and the ALP cloud 310 to perform their respective functions (e.g. analytics and reporting).

The target cameras 260A, zone traffic cameras 260B, and location traffic cameras 260 and some of their relationships to the ALP system(s) 210 and the ALP cloud 310 are described in more detail below.

The target cameras 260A may be, for example, target advertising cameras that are attached to the displays 280 and facing towards a viewing direction of the displays 280. The zone traffic cameras 260B may be cameras that are positioned within or near zones 115 to capture images of individuals within the interior of the zones 115. The store traffic cameras 260C may be cameras that are positioned nearby an entrance of a location 110 (e.g. a store entrance such as a doorway) to capture images of individuals entering or leaving the location 110.

Images from the target cameras 260A may be received by a component attached to or within the ALP system 210 (e.g. detection module 250) so that the ALP system 210 or the ALP cloud 310 may obtain a count of individuals in front of one or more displays 280 and may obtain demographics information (e.g. age and gender) of individuals within the images, by analyzing the images with the component. Images from the zone traffic cameras 260B may be received by a component attached to or within the ALP system 210 (e.g. detection module 250) so that the ALP system 210 or the ALP cloud 310 may obtain a count of individuals within a specified zone 115 and may obtain demographics information (e.g. age and gender) of individuals within the images, by analyzing the images with the component. Images from the store traffic cameras 260C may be received by a component attached to or within the ALP system 210 (e.g. detection module 250) so that the ALP system 210 or the ALP cloud 310 may obtain a count of individuals entering the location 110 and may obtain demographics information (e.g. age and gender) of individuals within the images, by analyzing the images with the component.

All or some of the information obtained from the images by each of the ALP systems 210 may be sent by the ALP system 210 to the ALP cloud 310. In embodiments, the ALP system 210 (or a detection module 250 connected thereto) may generate analytics data from the images, the analytics data containing a date and time of triggering, customer IDs of individuals recognized or identified from the images, orientations of faces or line of sights of individuals within the images, and demographics of individuals within the images. The customer IDs may be temporal IDS for privacy purposes. For example, the customer IDs may only exist for a predetermine amount of time (e.g. 1 minute). The ALP system 210 may upload the analytics data to the ALP cloud 310. In embodiments, the ALP cloud 310 may obtain impression counts and OTS counts based on the analytics data and PoP data. For example, the CAM 325 of the ALP cloud 310 may obtain the impression counts and the OTS counts by analyzing the analytics data and PoP data with or without using the rule engine or AI model 322. In embodiments, the ALP cloud 310 may perform reporting using data received from one or more of the local systems 110, including the analytics data of the respective ALP systems 210 of the local systems 120.

As previously mentioned with reference to FIGS. 1 and 3, the ALP cloud 310 may cause GUIs 380 to be displayed on user terminal(s) 140. In embodiments, a retailer may view the GUIs 380 on a web browser by accessing the ALP cloud 310, and one or more of the GUIs 380 may display customer insights regarding customers and the displays 280.

With reference to FIGS. 14-18, example GUIs of the GUIs 380 for reporting customer insights, including viewing analytics information, are described.

Figure 14:
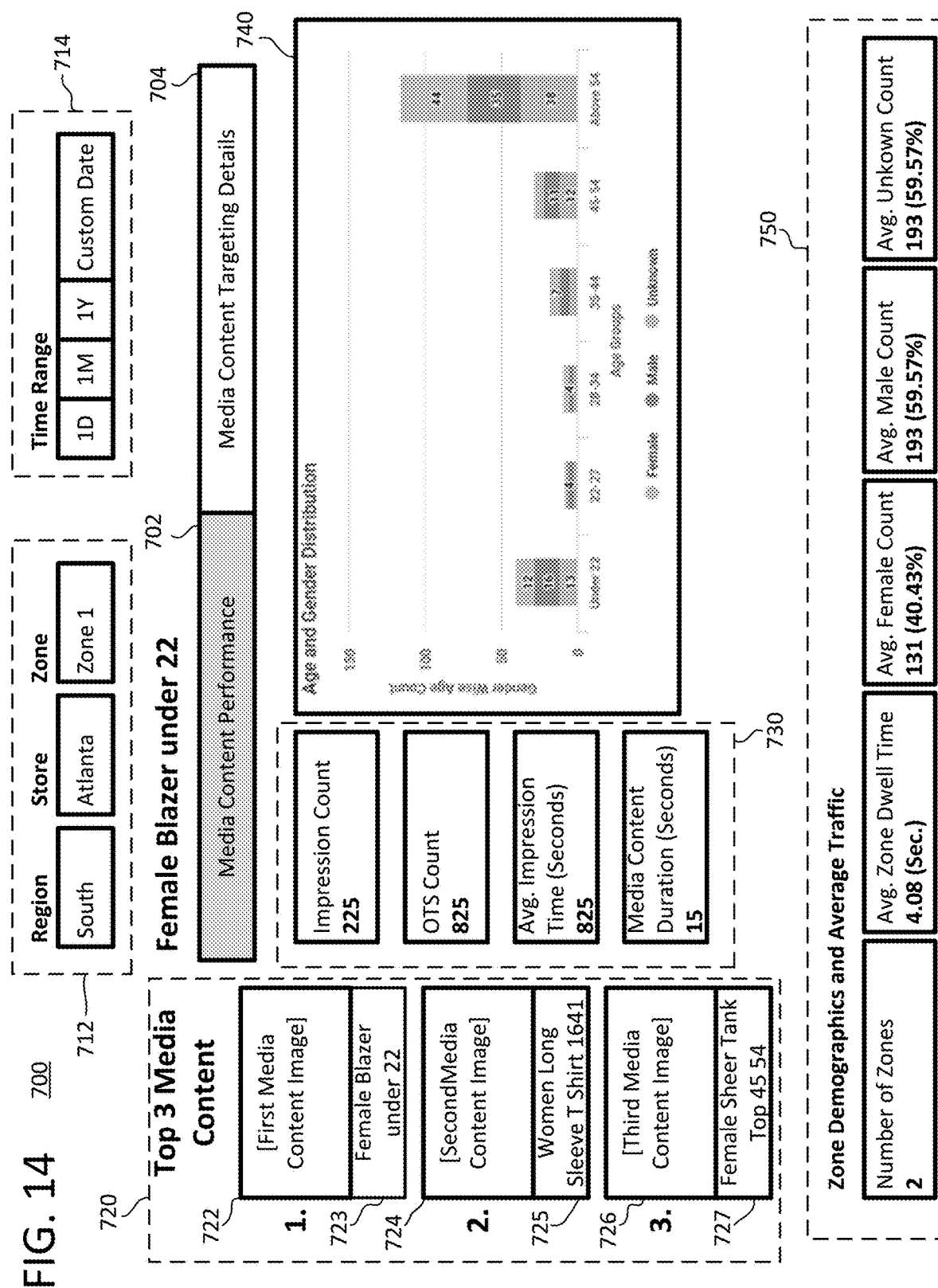
FIG. 14 illustrates a GUI of an embodiment when a first tab is active.

FIG. 14 illustrates a GUI 700 when a media content performance tab 702 is active. GUI 700 may be a retailer dashboard accessible by users such as, for example, retailers. The GUI 700 may include a location/zone selection section 712 that enables a user to select one or more locations 110 (e.g. stores) and one or more zones 115. The GUI 700 may further include a time range selection section 714 that enables a user to select a time range. In an embodiment, the ALP cloud 310 may cause a default selection for the location/zone selection section 712 and the time range selection section 714 when a user views the GUI 700. Based on the selections in the location-zone selection section 712 and the time range selection section 714, the GUI 700 may display a top media content section 720 that includes a list of media content ordered according to analysis insight for the selected location(s), zone(s), and time range. For example, the media content may be order according to impression counts or OTS counts, wherein the analysis insight type used for ordering may automatically be determined or manually selected by the user on the GUI 700. Additionally, the media content list may be a list of any number of media content (e.g. 3, 5, 10, etc.), and the number of media content in the list may automatically be determined or manually selected by the user on the GUI 700. As illustrated in FIG. 14, the top media content section 720 may include a first media content image 722, a second media content image 724, and a third media content image 726, that are each an image for a corresponding media content that may be displayed on displays 280. As illustrated in FIG. 14, the top media content section 720 may include titles 723, 725, 727 for the media contents indicated. The first media content image 722 and the title 723 may correspond to the media content that has the highest impression count (or another analytics insight) for the selected location(s), zone(s), and time range. According to the above, a user may quickly and easily understand the top media content for specified criteria.

When the media content performance tab 702 is active, as illustrated in FIG. 14, the GUI 700 may display performance information 730 including, for example, an impression count, OTS count, average impression time, and media content duration for a specified media content in the top media content section 720. The GUI 700 may also display an age and gender distribution graph 740 of the specified media content in the top media content section 720. A user may select (e.g. click on) any of the corresponding images or titles of media content shown in the top media content section 720 to select a particular media content, thereby causing the GUI 700 to display the corresponding performance information 730 and the age and gender distribution graph 740 for the media content selected. In an embodiment, the GUI 700 may display the age and gender distribution graph 740 of the impression count of the media content selected in response to a user selecting (e.g. clicking on) the impression count information in the performance information 730. In an embodiment, the GUI 700 may display an age and gender distribution graph of the OTS count of the media content selected in response to a user selecting (e.g. clicking on) the OTS information in the performance information 730. In an embodiment, the GUI 700 may also display information 750, which may include average traffic and demographics information for the media content selected.

The media content performance tab 702 may be a default active tab of the GUI 700, and may be activated, when not active, in response to a user making a selection with one or more of the location/zone selection section 712 and the time range selection section 714. When the media content performance tab 702 is activated, the GUI 700 may default to displaying the performance information 730 and the age and gender distribution graph 740 for the highest ranked media content of the top media content section 720. That is, the highest ranked media content may be a default selection.

Figure 15:
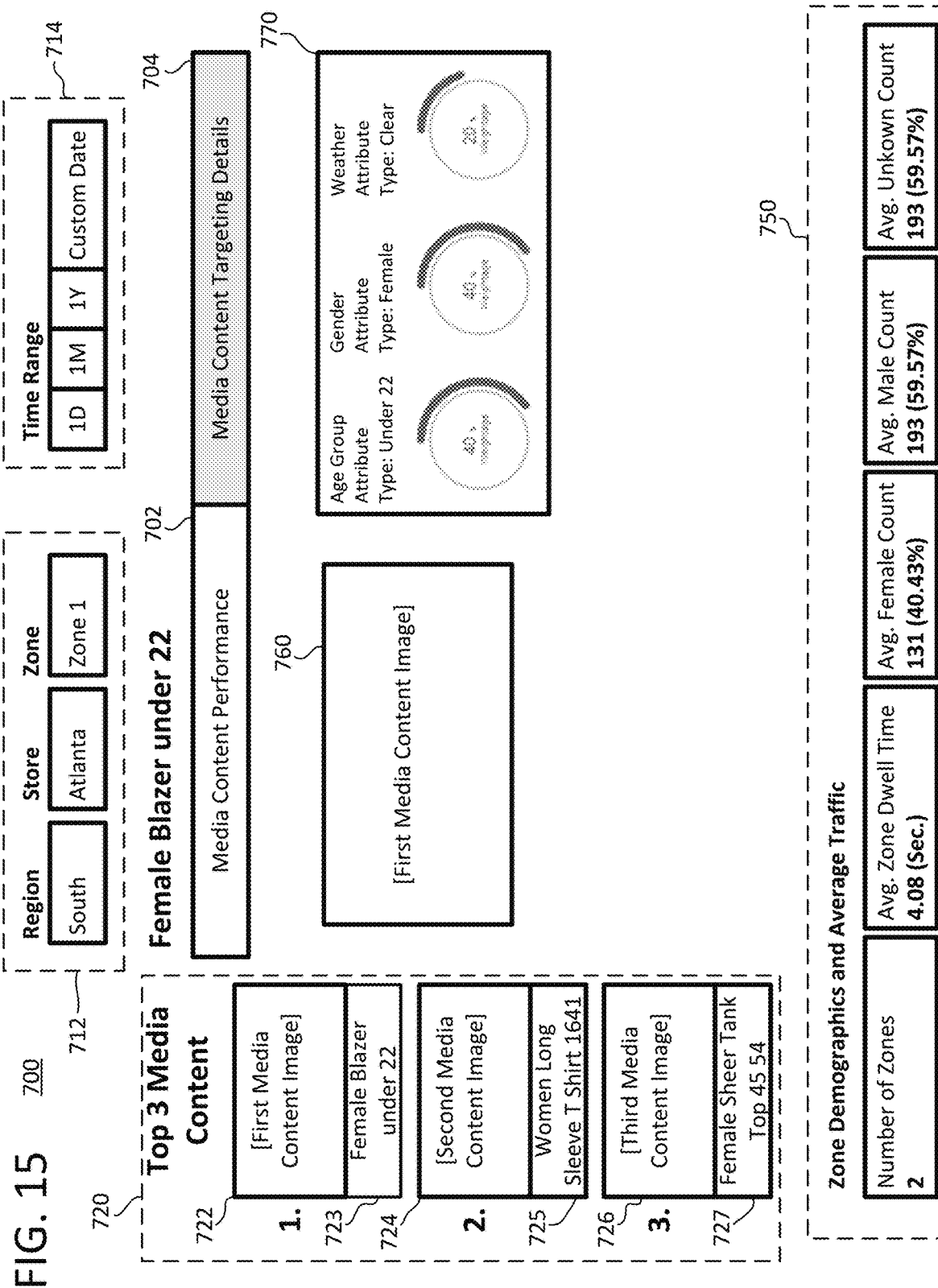
FIG. 15 illustrates the GUI of FIG. 14 when a second tab is active.

A user may select (e.g. click on) the media content targeting details tab 704 to activate the tab. Based on such a selection, the GUI 700 may display detailed image for the current media content selected in the top media content section 720. For example, as shown in FIG. 15, the GUI 700 displays an image 760 that is the same as the first media content image 722, and detailed information 770 of the top media content corresponding to the first media content image 722, when the media content targeting details tab 704 is active and the top media content is selected. The detailed information 770 may include, for example, an age group attribute (e.g. "under 22", "between "30 and 39", or "over 60"), a gender attribute (e.g. "female" or "male"), and a weather attribute (e.g. "clear", "rainy", "hot", "cold"), and their respective weightages. The detailed information 770 may also include a season attribute (e.g. "fall", "winter" or "summer"), and its weightage. The attributes and weightages in the detailed information 770 may be used as rules used by the ALP cloud 310 and/or the ALP system 210 for triggering the playing of media content. When the media content targeting details tab 704 is active, a user may select any of the media content listed in the top media content section 720 to cause the corresponding image 760 and detailed information 770 of the media content selected to be displayed. According to the above, a user may quickly and easily compare age and gender attributes.

As illustrated in FIGS. 14-15, the GUI 700 may be used to report customer insights concerning target media content (e.g. trigger media content). In embodiments, the GUI 700 may also display similar information for non-triggered media content that is scheduled in advanced for playing (e.g. media content played according to a playlist). In embodiments, the GUI 700 may enable a user to selected either or both of triggered media content and non-triggered media content and display information accordingly.

FIG. 16 illustrates a GUI 800A. The GUI 800A may be a part of a retailer dashboard accessible by users such as, for example, retailers. The GUI 800A may include a location/zone selection section 812 that enables a user to select one or more locations 110 (e.g. stores) and one or more zones 115. The GUI 800A may include a media content selection section 814 that enables a user to select one or more media contents that have previously been played on displays 280. The GUI 800A may include a time range selection section 816 that enables a user to select a time range. The GUI 800A may display various information for a selected media content(s) for the selected location(s), zone(s), and time range. For example, as illustrated in FIG. 16, the GUI 800A may display a visual 830 that includes transitions of impression counts and OTS counts for the selected media content(s) for a selected location(s), zone(s), and time range. The GUI 800A may also display a visual 840 which displays age and gender distribution for the selected media content(s) for a selected location(s), zone(s), and time range. The GUI 800A may alternatively or additionally display visuals with other analytical information for the selected media content(s) for a selected location(s), zone(s), and time range. For example, the GUI 800A may display information 820, which includes an average impression count, total impression count, playtime impression count, and number of times played, with respect to the selected media content(s) for a selected location(s), zone(s), and time range.

In an embodiment, the GUI 800 or other GUI may display a list of locations 110 and/or zones 115 according to impression counts or OTS counts. For example, the list displayed may be a list of the top locations 110 or the top zones 115, ordered by impression counts or OTS counts. According to such an embodiment, users (e.g. retailers) may quickly and easily know the top location 110 and/or zone 115 where impression count or OTS count is maximum.

In an embodiment, a GUI may display media content impressions counts (and/or OST counts) for two or more locations 110 and/or zones 115 at the same time. For example, with reference to FIG. 17, GUI 800B may display visuals 835 and 845, instead of visuals 830 and 840 of FIG. 16, based on two zones 115 (or two locations 110) being selected with the location/zone selection section 812. Visual 835 may include transitions of impression counts and OTS counts for the selected media content(s) for a first selected location or zone during a specified time range. Visual 860 may include transitions of impression counts and OTS counts for the selected media content(s) for a second selected location or zone during a specified time range. As illustrated in FIG. 17, when two zones are selected, the GUI 800B may display visual 835 with impression count and OTS count information for a first selected zone, and display visual 845 with impression count and OTS count information for a second selected zone. According to the above, users (e.g. retailers) may quickly and easily compare message impression counts or other information between different locations 110 and/or zones 115.

FIG. 18 illustrates a GUI 850. The GUI 850 may be a part of a retailer dashboard accessible by users such as, for example, retailers. The GUI 850 may display total impressions which may be the summation of all impressions of all media content that is played over a particular display(s) 280 for a selected location(s) 110 and/or zone(s) 115 and selected time range.

As illustrated in FIG. 18, the GUI 850 may include a location/zone selection section 862 that enables a user to select one or more locations 110 (e.g. stores) and one or more zones 115. The GUI 850 may include a time range selection section 864 that enables a user to select a time range. The GUI 850 may further display a visual 870 and a visual 880, that each display viewing analytics information for all media content that is played over a particular display(s) 280 for a selected location(s) 110 and/or zone(s) 115 and selected time range. For example, as illustrated in FIG. 18, visual 870 includes a graph displaying transitions of total message impression count for all media content played on displays 280 in all selected zones 155 of a selected location 110 (e.g. store) during a specified time range. In embodiments, visual 860 may alternative or additionally include a graph displaying total OTS counts. Also, as illustrated in FIG. 18, visual 880 includes a graph and counts displaying age and gender distributions for all selected zones 115 of a selected location 110 (e.g. store) during a specified time range.

In an embodiment, the GUIs of the present disclosure may enable a user to select one or more of any locale (e.g. locations 110, zones 115, and digital displays), and display analytics information, including the analytics information described above, concerning the digital display(s) associated with the selected one or more of the locales selected.

In an embodiment, the GUI 850 or other GUI may display a list of locations 110 and/or zones 115, and/or displays according total impression counts or total OTS counts. For example, the list displayed may be a list of the top locations 110 or the top zones 115, ordered by total impression counts or total OTS counts. According to such an embodiment, users (e.g. retailer) may quickly and easily know the top location 110 and/or zone 115 where the total impression count or total OTS count is maximum for one or more media content that may be selected.

In an embodiment, the GUI 850 or other GUI may display total impression counts or other viewing analytics information of two or more locations 110 (e.g. stores) and/or zones 115 at the same time. According to the above, users (e.g. retailers) may quickly and easily compare total message impression counts or other information between different locations 110 and/or zones 115.

In embodiments of the present disclosure, each of the ALP system 210, the CMS 240, and the cloud services (including the CAM 325, the ME module 315, and the CMS cloud 340 may be implemented by at least one processor. For example, in an embodiment, the ALP system and the CMS 240 may be implemented by the same or separate at least one first processor, and the CAM 325. ME module 315, and the CMS cloud 340 of the cloud services may be implemented by the same or separate at least one second processor.

Aspects of the present disclosure relating to the creation of new media content and the triggering of playing of media content may achieve a benefit of enabling media content that is more in-line to specific customer segment needs to be created and played. Accordingly, some embodiments of the present disclosure may cause created and triggered media content to be more engaging, thus potentially leading to more sales in stores. Moreover, by providing individuals with targeted product and service information in the form of media content, the individuals engagement and loyalty may increase. Accordingly, some embodiments of the present disclosure result in the enhancement of customer experience (e.g. impressions), thus leading to higher sales for retailers. Also, some embodiments of the present disclosure enable users to understand who is in a store or aisle at a specific time, the triggering of the relevant media content to be played, the users to understand the impact of media content on individuals, and the prediction of what media content will be most relevant to the individuals.

The whole or part of the example embodiments disclosed above can be described as, but not limited to, the following supplementary notes.

[Supplemental Note 1]
A system comprising:
a remote computing system configured to cause a user display to display a graphical user interface (GUI), wherein
the GUI enables a user to select a time range and a locale,
the GUI displays a list of a plurality of media content that have been displayed on one or more digital displays associated with the locale, each of the plurality of media content being listed according to impression counts of each of the plurality of media content for the locale selected and the time range selected, and
each of the impression counts is a count of views by people of a respective media content of the plurality media content on the one or more digital displays of the locale.

[Supplemental Note 2]
The system of SUPPLEMENTAL NOTE 1, wherein
in response to the user selecting media content of the list of the plurality of media content displayed on the GUI, the GUI displays age and gender distributions of the impression count of the media content selected for the locale selected and the time range selected.

[Supplemental Note 3]
The system of SUPPLEMENTAL NOTE 1 or 2, wherein
in response to the user selecting media content of the list of the plurality of media content displayed on the GUI, the GUI displays age and gender distributions of an opportunity to see (OTS) count of the media content selected for the locale selected and the time range selected,
the OTS count being a count of people who were determined to have had an opportunity to see the media content on the one or more digital displays of the locale.

[Supplemental Note 4]
The system of SUPPLEMENTAL NOTE 1, 2, or 3, wherein
the GUI enables the user to select one or both of triggered media content and non-triggered media content of the plurality of media content that have been displayed, and the GUI displays the list of the plurality of media content based on selection of one or both of the triggered media content and the non-triggered media content,
the triggered media content being media content selectively displayed on at least one of the one or more digital displays based on information about at least one person while the at least one person is at the locale, and
the non-triggered media content being media content that is displayed on at least one of the one or more digital displays according to a playlist of the media content scheduled in advance.

[Supplemental Note 5]
The system of SUPPLEMENTAL NOTE 1, 2, 3, or 4, wherein
the remote computing system is further configured to receive, via a wide area network, customer demographics data from a local computing system that obtains the customer demographics data by processing camera data received from at least one camera,
the local computing system is configured to select media content from the plurality of media content based on applying the customer demographics data to the rule set or AI model, and cause at least one of the one or more digital displays to play the media content based on selecting the media content.

[Supplemental Note 6]
The system of SUPPLEMENTAL NOTE 5, wherein
the remote computing system is further configured to receive, from the local computing system via the wide area network, analytics data comprising dates and times of displaying of the media content on the at least one of the one or more digital displays, a customer identification (ID) of at least one person of the people, orientation information of a face of the at least one person, and the customer demographics information, and
the remote computing system obtains the impression counts of the plurality of media content based on the analytics data.

[Supplemental Note 7]
The system of SUPPLEMENTAL NOTE 6, wherein
the remote computing system is further configured to receive proof of play data that comprises the dates and the times of displaying of the plurality of media content on the at least one of the one or more digital displays, and IDs of the plurality of media content displayed on the at least one of the one or more digital displays, and
the remote computing system obtains the impression counts of the plurality of media content based on the analytics data and the proof of play data.

[Supplemental Note 8]

The system of SUPPLEMENTAL NOTE 1, 2, or 3, wherein the remote computing system is further configured to receive analytics data comprising dates and times of displaying of the plurality of media content on at least one of the one or more digital displays, a customer identification (ID) of at least one person of the people, orientation information of a face of the at least one person, and customer demographics information, and the remote computing system obtains the impression counts of the plurality of media content based on the analytics data.

[Supplemental Note 9]

The system of SUPPLEMENTAL NOTE 8, wherein the remote computing system is further configured to receive proof of play data that comprises the dates and times of displaying of the media content on the at least one of the one or more digital displays, and IDs of the plurality of media content displayed on the at least one of the one or more digital displays, and the remote computing system obtains the impression counts of the plurality of media content based on the analytics data and the proof of play data.

[Supplemental Note 10]

The system of SUPPLEMENTAL NOTE 9, wherein the remote computing system obtains opportunity to see (OTS) counts of the plurality of media content based on the analytics data and the proof of play data, each of the OTS counts being a count of people who were determined to have had an opportunity to see a respective media content displayed on at least one of the one or more digital displays.

[Supplemental Note 11]

The system of SUPPLEMENTAL NOTE 1-10, wherein the locale selectable is at least one from among a location including the one or more digital displays, a zone within the location in which the one or more digital displays is viewable, or the one or more digital displays.

[Supplemental Note 12]

The system of SUPPLEMENTAL NOTE 11, wherein the location is a store.

[Supplemental Note 13]

A method performed by a remote computing system, the method comprising:

causing a user display to display a graphical user interface (GUI) that enables a user to select a time range and a locale; and causing the user display to display, on the GUI, a list of a plurality of media content that have been displayed on one or more digital displays associated with the locale, each of the plurality of media content being listed according to impression counts of each of the plurality of media content for the locale selected and the time range selected, wherein each of the impression counts is a count of views by people of a respective media content of the plurality media content on the one or more digital displays of the locale.

[Supplemental Note 14]

The method of SUPPLEMENTAL NOTE 13, further comprising causing, in response to the user selecting media content of the list of the plurality of media content displayed on the GUI, the user display to display, on the GUI, age and gender distributions of the impression count of the media content selected for the locale selected and the time range selected.

[Supplemental Note 15]

The method of SUPPLEMENTAL NOTE 13 or 14, further comprising:

causing, in response to the user selecting media content of the list of the plurality of media content displayed on the GUI, the user display to display, on the GUI, age and gender distributions of an opportunity to see (OTS) count of the media content selected for the locale selected and the time range selected, wherein the OTS count is a count of people who were determined to have had an opportunity to see the media content on the one or more digital displays of the locale.

[Supplemental Note 16]

The method of SUPPLEMENTAL NOTE 13, 14, or 15, wherein the GUI displayed enables the user to select one or both of triggered media content and non-triggered media content of the plurality of media content that have been displayed on the one or more digital displays, and the GUI displays the list of the plurality of media content based on selection of one or both of the triggered media content and the non-triggered media content, the triggered media content being media content selectively displayed on at least one of the one or more digital displays based on information about at least one person while the at least one person is at the locale, and the non-triggered media content being media content that is displayed on at least one of the one or more digital displays according to a playlist of the media content scheduled in advance.

[Supplemental Note 17]

The method of SUPPLEMENTAL NOTE 13, 14, 15, or 16, further comprising:

receiving, via a wide area network, customer demographics data from a local computing system that obtains the customer demographics data by processing camera data received from at least one camera, wherein the local computing system is configured to select media content from the plurality of media content based on applying the customer demographics data to the rule set or AI model, and cause at least one of the one or more digital displays to play the media content based on selecting the media content.

[Supplemental Note 18]

The method of SUPPLEMENTAL NOTE 17, further comprising:

receiving, from the local computing system via the wide area network, analytics data comprising dates and times of displaying of the plurality of media content on the at least one of the one or more digital displays, a customer identification (ID) of at least one person of the people, orientation information of a face of the at least one person, and the customer demographics information: and obtaining the impression counts of the plurality of media content based on the analytics data.

[Supplemental Note 19]

The method of SUPPLEMENTAL NOTE 18, further comprising:

receiving proof of play data that comprises the dates and the times of displaying of the plurality of media content on the at least one of the one or more digital displays, and IDs of the plurality of media content displayed on the at least one of the one or more digital displays; and obtaining the impression counts of the plurality of media content based on the analytics data and the proof of play data.

[Supplemental Note 20]

The method of SUPPLEMENTAL NOTE 13, 14, or 15, further comprising:

receiving analytics data comprising dates and times of displaying of the plurality of media content on at least one of the one or more digital displays, a customer identification (ID) of at least one person of the people, orientation information of a face of the at least one person, and customer demographics information, and obtaining the impression counts of the plurality of media content based on the analytics data.

[Supplemental Note 21]

A system comprising:

a remote computing system configured to cause a user display to display a graphical user interface (GUI), wherein the GUI enables a user to select a time range, a locale, and media content from a list of a plurality of media content, the GUI displays viewing analytics information of the media content selected for the time range selected and the locale selected, and the viewing analytics information includes an impression count that is a count of views by people of the media content selected on one or more digital displays associated with the locale selected, or an opportunity to see (OTS) count that is a count of people who were determined to have had an opportunity to see the media content displayed on the one or more digital displays of the locale.

[Supplemental Note 22]

The system of SUPPLEMENTAL NOTE 21, wherein the GUI enables the user to select a second locale, and the GUI displays viewing analytics information of the media content selected for the time range selected and the second locale selected, at a same time in which the GUI displays the viewing analytics information of the media content selected for the time range selected and the locale selected.

As used herein, the term component is intended to be broadly construed as hardware, firmware, or a combination of hardware and software.

The foregoing disclosure provides illustration and description, but is not intended to be exhaustive or to limit the implementations to the forms explicitly described. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of embodiments of the present disclosure.

Even though combinations of features are recited in the claims and/or disclosed in the specification, these combinations are not intended to limit the disclosure of possible implementations. Many of the described features may be combined in ways not explicitly recited in the claims and/or explicitly described in the above disclosure. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on" unless explicitly stated otherwise. The term "or" as used herein is an inclusive "or", and has a meaning equivalent to "and/or."

What is claimed:

1. A system comprising:

a remote computing system comprising at least one processor, the remote computing system configured to cause a user display to display a graphical user interface (GUI), wherein the GUI enables a user to select a time range and a locale, the GUI displays a list of a plurality of media content that have been displayed on one or more digital displays associated with the locale, each of the plurality of media content being ordered according to impression counts of each of the plurality of media content for the locale selected and the time range selected, each of the impression counts is a count of views by people of a respective media content of the plurality media content on the one or more digital displays of the locale, the GUI enables the user to select a single digital display as the locale, and the GUI displays impression counts of each of a plurality of media content that have been displayed on the single digital display selected, in the time range selected.

2. The system of claim 1, wherein in response to the user selecting media content of the list of the plurality of media content displayed on the GUI, the GUI displays age and gender distributions of the impression count of the media content selected for the locale selected and the time range selected, and the list of the plurality of media content and the age and gender distributions are displayed at a same time.

3. The system of claim 1, wherein in response to the user selecting media content of the list of the plurality of media content displayed on the GUI, the GUI displays age and gender distributions of an opportunity to see (OTS) count of the media content selected for the locale selected and the time range selected, the OTS count being a count of people who were determined to have had an opportunity to see the media content on the one or more digital displays of the locale.

4. The system of claim 1, wherein the GUI enables the user to select one or both of triggered media content and non-triggered media content of the plurality of media content that have been displayed, and the GUI displays the list of the plurality of media content based on selection of one or both of the triggered media content and the non-triggered media content, the triggered media content being media content selectively displayed on at least one of the one or more digital displays based on information about at least one person while the at least one person is at the locale, and the non-triggered media content being media content that is displayed on at least one of the one or more digital displays according to a playlist of the media content scheduled in advance.

5. The system of claim 1, wherein the remote computing system is further configured to receive, via a wide area network, customer demographics data from a local computing system that obtains the customer demographics data by processing camera data received from at least one camera, the local computing system is configured to select media content from the plurality of media content based on applying the customer demographics data to the rule set or AI model, and cause at least one of the one or more digital displays to play the media content based on selecting the media content.

6. The system of claim 5, wherein the remote computing system is further configured to receive, from the local computing system via the wide area network, analytics data comprising dates and times of displaying of the media content on the at least one of the one or more digital displays, a customer identification (ID) of at least one person of the people, orientation information of a face of the at least one person, and the customer demographics information, and the remote computing system obtains the impression counts of the plurality of media content based on the analytics data.

7. The system of claim 6, wherein the remote computing system is further configured to receive proof of play data that comprises the dates and the times of displaying of the plurality of media content on the at least one of the one or more digital displays, and IDs of the plurality of media content displayed on the at least one of the one or more digital displays, and the remote computing system obtains the impression counts of the plurality of media content based on the analytics data and the proof of play data.

8. The system of claim 1, wherein the remote computing system is further configured to receive analytics data comprising dates and times of displaying of the plurality of media content on at least one of the one or more digital displays, a customer identification (ID) of at least one person of the people, orientation information of a face of the at least one person, and customer demographics information, and the remote computing system obtains the impression counts of the plurality of media content based on the analytics data.

9. The system of claim 8, wherein the remote computing system is further configured to receive proof of play data that comprises the dates and times of displaying of the media content on the at least one of the one or more digital displays, and IDs of the plurality of media content displayed on the at least one of the one or more digital displays, and the remote computing system obtains the impression counts of the plurality of media content based on the analytics data and the proof of play data.

10. The system of claim 9, wherein the remote computing system obtains opportunity to see (OTS) counts of the plurality of media content based on the analytics data and the proof of play data, each of the OTS counts being a count of people who were determined to have had an opportunity to see a respective media content displayed on at least one of the one or more digital displays.

11. A method performed by a remote computing system, the method comprising:

causing a user display to display a graphical user interface (GUI) that enables a user to select a time range and a locale;

causing, based on the user selecting a single digital display as the locale, the user display to display, on the GUI, a list of a plurality of media content that have been displayed on the single digital display associated with the locale, each of the plurality of media content being ordered according to impression counts of each of the plurality of media content for the locale selected and the time range selected; and causing the user display to display, on the GUI, the impression counts of each of the plurality of media content that have been displayed on the single digital display selected, in the time range selected, wherein each of the impression counts is a count of views by people of a respective media content of the plurality media content on the single digital display of the locale.

12. The method of claim 11, further comprising:

causing, in response to the user selecting media content of the list of the plurality of media content displayed on the GUI, the user display to display, on the GUI, age and gender distributions of the impression count of the media content selected for the locale selected and the time range selected, and the list of the plurality of media content and the age and gender distributions are displayed at a same time.

13. The method of claim 11, further comprising:

causing, in response to the user selecting media content of the list of the plurality of media content displayed on the GUI, the user display to display, on the GUI, age and gender distributions of an opportunity to see (OTS) count of the media content selected for the locale selected and the time range selected, wherein the OTS count is a count of people who were determined to have had an opportunity to see the media content on the single digital display of the locale.

14. The method of claim 11, wherein the GUI displayed enables the user to select one or both of triggered media content and non-triggered media content of the plurality of media content that have been displayed on the single digital display, and the GUI displays the list of the plurality of media content based on selection of one or both of the triggered media content and the non-triggered media content, the triggered media content being media content selectively displayed on the single digital display based on information about at least one person while the at least one person is at the locale, and the non-triggered media content being media content that is displayed on the single digital display according to a playlist of the media content scheduled in advance.

15. The method of claim 11, further comprising:

receiving, via a wide area network, customer demographics data from a local computing system that obtains the customer demographics data by processing camera data received from at least one camera, wherein the local computing system is configured to select media content from the plurality of media content based on applying the customer demographics data to the rule set or AI model, and cause the single digital display to play the media content based on selecting the media content.

16. The method of claim 15, further comprising:

receiving, from the local computing system via the wide area network, analytics data comprising dates and times of displaying of the plurality of media content on the single digital display, a customer identification (ID) of at least one person of the people, orientation information of a face of the at least one person, and the customer demographics information; and obtaining the impression counts of the plurality of media content based on the analytics data.

17. The method of claim 16, further comprising:
receiving proof of play data that comprises the dates and the times of displaying of the plurality of media content on the single digital display, and IDs of the plurality of media content displayed on the single digital display; and
obtaining the impression counts of the plurality of media content based on the analytics data and the proof of play data.

18. The method of claim 11, further comprising:
receiving analytics data comprising dates and times of displaying of the plurality of media content on the single digital display, a customer identification (ID) of at least one person of the people, orientation information of a face of the at least one person, and customer demographics information, and
obtaining the impression counts of the plurality of media content based on the analytics data.

19. A system comprising:
a remote computing system comprising at least one processor, the remote computing system configured to cause a user display to display a graphical user interface (GUI), wherein
the GUI enables a user to select a time range, a locale, and media content from a list of a plurality of media content,
the GUI displays viewing analytics information of the media content selected for the time range selected and the locale selected, and
the viewing analytics information includes a transition of an impression count that is a count of views by people of the media content selected on one or more digital displays associated with the locale selected, and a transition of an opportunity to see (OTS) count that is a count of people who were determined to have had an opportunity to see the media content displayed on the one or more digital displays of the locale, the transition of the impression count and the transition of the OTS count being displayed at a same time in a same graph,
the GUI enables the user to select a single digital display as the locale, and
the transition of the impression count, that is displayed by the GUI, is a count of views by people of the media content selected on the single digital display selected in the time range selected, and the transition of the OTS count, that is displayed by the GUI, is a count of people who were determined to have had an opportunity to see the media content displayed on the single digital display selected in the time range selected.

20. The system of claim 19, wherein
the GUI enables the user to select a second locale, and
the GUI displays viewing analytics information of the media content selected for the time range selected and the second locale selected, at a same time in which the GUI displays the viewing analytics information of the media content selected for the time range selected and the locale selected.

* * * * *